United States Patent
Matsumoto et al.

(10) Patent No.: US 8,014,071 B2
(45) Date of Patent: Sep. 6, 2011

(54) LIGHT SELECTIVE TRANSMISSION FILTER

(75) Inventors: Ai Matsumoto, Takatsuki (JP); Tatsushi Hirauchi, Takatsuki (JP); Junichi Nakamura, Suita (JP); Yasunori Tsujino, Ibaraki (JP); Shinpei Sato, Suita (JP); Keiko Ando, Ibaraki (JP); Yoko Matsui, Sendai (JP); Kozo Tajiri, Sanda (JP)

(73) Assignee: Nippon Shokubai Co., Ltd., Osaka (JP)

( * ) Notice: Subject to any disclaimer, the term of this patent is extended or adjusted under 35 U.S.C. 154(b) by 293 days.

(21) Appl. No.: 11/965,421

(22) Filed: Dec. 27, 2007

(65) Prior Publication Data

US 2008/0165421 A1    Jul. 10, 2008

(30) Foreign Application Priority Data

Dec. 28, 2006    (JP) .................. 2006-356401

(51) Int. Cl.
   *G02B 5/28*    (2006.01)
(52) U.S. Cl. ...................... 359/589; 359/582
(58) Field of Classification Search ........... 359/589, 359/582
   See application file for complete search history.

(56) References Cited

U.S. PATENT DOCUMENTS

| | | | | |
|---|---|---|---|---|
| 2003/0013280 A1* | 1/2003 | Yamanaka | | 438/487 |
| 2004/0038408 A1* | 2/2004 | Abbott et al. | | 436/4 |
| 2004/0165095 A1 | 8/2004 | Shimizu et al. | | |
| 2004/0197705 A1* | 10/2004 | Shimizu et al. | | 430/270.2 |
| 2005/0233123 A1* | 10/2005 | Weber et al. | | 428/215 |
| 2005/0237632 A1 | 10/2005 | Nakamura | | |
| 2006/0046065 A1* | 3/2006 | Suzuki et al. | | 428/412 |
| 2006/0291061 A1 | 12/2006 | Iyama et al. | | |
| 2007/0052886 A1* | 3/2007 | Fan et al. | | 349/98 |

FOREIGN PATENT DOCUMENTS

| | | |
|---|---|---|
| JP | 2004-139035 | 5/2004 |
| JP | 2004361724 | 12/2004 |
| JP | 2005-223242 | 8/2005 |
| JP | 2005-243509 | 9/2005 |
| JP | 2005-272814 | 10/2005 |
| JP | 2005-309210 A | 11/2005 |
| JP | 2005-338395 A | 12/2005 |
| JP | 2006-18253 A | 1/2006 |
| JP | 2006-030944 A | 2/2006 |
| JP | 2006220873 | 8/2006 |
| JP | 2006-330128 | 12/2006 |
| JP | 2007-078786 | 3/2007 |

* cited by examiner

*Primary Examiner* — Joshua L Pritchett

(74) *Attorney, Agent, or Firm* — Connolly Bove Lodge & Hutz LLP

(57) ABSTRACT

The present invention provides a light selective transmission filter which selectively shields light and has a high transmittance of light at a specific wavelength such as visible rays, and which has a sufficiently reduced thickness and excellent heat resistance. The present invention further provides a lens unit including such a light selective transmission filter. The light selective transmission filter selectively reducing a transmittance of light has a thickness of less than 200 μm and includes a base material containing a functional film with reflow resistance. The lens unit includes such a light selective transmission filter and a lens.

17 Claims, 3 Drawing Sheets

LIGHT SELECTIVE TRANSMISSION FILTER

TECHNICAL FIELD

The present invention relates to a light selective transmission filter. More specifically, the present invention relates to a light selective transmission filter which is useful in an optical application such as a lens unit, an opto device application and which can be used in a display device application or as a mechanical component, an electrical or electronic component, and the like.

BACKGROUND ART

The light selective transmission filter is useful as a mechanical component, an electrical or electronic component, an automobile component, and the like, and particularly preferably used as an optical member. For example, a camera module includes an infrared shielding (cut) filter which shields infrared rays (especially infrared rays at a wavelength of more than 800 nm) which causes optical noise, thereby making an amount of absorption wave smaller than the amount of reflection wave. An infrared rays shielding glass which has an inorganic multilayer film formed by depositing a metal and the like on a glass filter and controls refractive indexes of respective wavelengths has been currently used. Optical members and the like have been recently downsized. For example, a digital camera module is mounted on a cellular phone. Therefore, a reduction in size of the optical members has been increasingly desired. Along with this, a reduction in size is needed for a filter for cutting infrared rays, used in a digital camera module and the like, or a lens unit having a lens and the like.

With respect to a near-infrared cut filter, for example, Japanese Kokai Publication No. 2006-30944 on pages 1 and 2 discloses a near-infrared cut filter having a near-infrared reflection film consisting of a dielectric multilayer film formed by alternately stacking dielectric layers with different refractive indexes on one surface of a transparent base material made of a thermal plastic resin having a specific glass transition temperature and a specific linear expansion coefficient, and at least one functional film selected from the group consisting of an equivalent refractive index film, a reflection preventing film, and a hard coat film on the other surface of the transparent base material. Further, Japanese Kokai Publication No. 2005-338395 on pages 1 and 2 discloses a near-infrared cut filter including a norbornene resin base material and a near-infrared reflection film.

However, if a film for reflecting or shielding infrared rays is formed by deposition, the deposition is performed at a temperature of several hundreds degrees or more. Therefore, the material for the base material needs to have heat resistance. Therefore, there is room for improvement in order to provide the material for the base material with sufficient heat resistance and form various materials for shielding infrared rays by various methods.

With respect to a lens unit, Japanese Kokai Publication No. 2005-309210 on pages 1 and 2 discloses an imaging lens which is constituted by disposing the first lens turning its convex surface to an object side and having main positive power, the second meniscus-shaped lens turning its concave surface to the object side, and the third lens functioning as a correction lens in this order from the object side to an image surface side, and in which a radius of curvature of the center of the surface (the first surface) on the object side of the first and second lenses and the focal distance of the entire lens system satisfy specific conditions. Japanese Kokai Publication No. 2006-18253 on pages 1 and 2 discloses a plate material-including optical member which is disposed on an optical axis and exhibits a specific function, wherein one or both surfaces of the plate material is/are set in aspherical shape, which corrects aberration of an optical system including such an optical member.

However, the technology on these lenses and optical members is insufficient for improvement in functions and added values, which has been currently developed in an optical field. There is room for improvement in order to provide an optical device with higher added values, for example, by downsizing components other than the filter correcting aberration of a lens or an optical system, thereby permitting a reduction in size of a lens unit.

DISCLOSURE OF THE INVENTION

Problem to be Solved by the Invention

The present invention has been made in view of the above-mentioned state of the art. The present invention has an object to provide a light selective transmission filter which selectively shields light, has a high transmittance of light at a specific wavelength such as visible rays, and has a sufficiently reduced thickness and excellent heat resistance and mechanical strength (bending strength). The present invention also has an object to provide a lens unit having such a light selective transmission filter.

Means for Solving the Problem

The present inventor made various investigations on a light selective transmission filter which selectively reduces a transmittance of light. The inventor found that if such a light selective transmission filter has a reduced thickness, a focal length can be decreased and an optical path length can be shortened, and therefore such a filter can be useful in an optical member including a light selective transmission filter, such as a camera module. The inventor also found that if the light selective transmission filter includes a base material having a specific configuration, the filter can be thinned and further obtain reflow resistance (heat resistance). As a result, the above-mentioned problems have been admirably solved. Further, the inventor found that a lens unit including the light selective transmission filter can be downsized and therefore, the lens unit can be preferably used not only in such an optical application but also in an opto device application, a display device application, and other applications such as a mechanical component and an electrical or electronic component. As a result, the present invention has been completed.

That is, the present invention is a light selective transmission filter selectively reducing a transmittance of light, wherein the light selective transmission filter has a thickness of less than 200 μm.

The present invention is also a lens unit including the light selective transmission filter and a lens.

The present invention is mentioned below in more detail.

The terms "or more" and "or less" mean that the described value is included. That is, the term "or more" means that the described value and values higher than the described value are included.

The light selective transmission filter of the present invention selectively reduces a transmittance of light and has a thickness of less than 200 μm. Such a light selective transmission filter can be particularly preferably used in an optical member.

"Configuration of Light Selective Transmission Filter"

The above-mentioned light selective transmission filter has a thickness of less than 200 μm. With respect to the thickness of the light selective transmission filter, the maximum thickness is less than 200 μm. The thickness of the above-mentioned light selective transmission filter is more preferably 100 μm or less, and still more preferably 75 μm or less, and particularly preferably 50 μm or less. The thickness of the light selective transmission filter is preferably 1 to 90 μm and more preferably 30 to 50 μm.

If the above-mentioned light selective transmission filter has a thickness of less than 200 μm, the light selective transmission filter can be downsized and lightened, and therefore such a filter can be preferably used in various applications. Such a filter can be particularly preferably used in an optical application such as an optical member. In the optical application, also for the light selective transmission filter as well as other optical members, a reduction in size and weight is strongly needed. A conventionally used filter having a thickness of 200 μm or more can not meet such a need. If the light selective transmission filter of the present invention has a thickness of less than 200 μm, the filter can be thinned. Particularly if the filter is used in a lens unit, a low profile of the lens unit is permitted. That is, if the light selective transmission filter having a thin thickness of less than 200 μm is used as an optical member, an optical path can be shortened and the optical member can be downsized. Specifically, a camera module includes a lens and the light selective transmission filter, and a CMOS sensor. Each of FIGS. 1 and 2 schematically shows one example of a camera module. These figures are referred to documents in Electronic Journal the 81th Technical Seminar. As shown in FIG. 1, the light selective transmission filter has a function of cutting light at a desired wavelength (for example, light at a wavelength of 700 nm or more in a camera module) and preventing a glitch in a CMOS sensor. If the light selective transmission filter is included in the camera module, the focal length is increased and the back focus is extended. As a result, the module gets larger. If the thickness of the light selective transmission filter is defined as t and the refractive index n is about 1.5, as shown in FIG. 2, the back focus is extended by about t/3, and thereby the module gets larger. However, if the thickness of the light selective transmission filter is reduced and the focal length is decreased, the module can be downsized. Accordingly, it is preferable that the optical path length of a camera module in 1/10 inch optical size accounts for 120% or less relative to the optical path length of a camera module without the optical selective transmission filter. The optical path length more preferably accounts for 110% or less and still more preferably 105% or less.

The above-mentioned light selective transmission filter selectively reduces a transmittance of light. The filter reduces light at 10 nm to 100 μm, and light to be reduced can be selected depending on an application in which the filter is used. For example, a light selective transmission filter which reduces a transmittance of infrared reduces infrared rays at 780 nm to 10 μm and transmits light at other wavelengths. Further, a light selective transmission filter which reduces a transmittance of UV reduces UV rays at 380 nm or less and transmits light at other wavelengths.

The transmittance of the above-mentioned wavelength whose transmittance should be selectively reduced is preferably 10% or less, and more preferably 5% or less, and still more preferably 3% or less. Most preferably, the transmittance is substantially 0%. The transmittance of the wavelength passing through the light selective transmission filter is preferably 70% or more. The transmittance is more preferably 75% or more, still more preferably 80% or more, and particularly preferably 85% or more, and most preferably 90% or more.

With respect to the above-mentioned light selective transmission filter, it is preferable that transmittances of the wavelengths other than the selectively reduced wavelength (wavelengths passing through the light selective transmission filter) are uniform. Particularly, if such a light selective transmission filter is used in a camera module or an optical application such as a filter for reducing optical noise in a lens unit of an imaging lens, it is preferable that transmittances of visible rays at 380 to 780 nm of visible rays in the entire wavelength region are uniform. In the above-mentioned application, it is particularly preferable that the transmittances of visible rays at a wavelength of 400 to 600 nm are uniform. If the transmitted light has a uniform intensity independently from the wavelength, a difference in light intensity is generated in the light at a specific wavelength. Therefore, the transmitted light is transparent without coloring. As a result, light which has passed through the light selective transmission filter is not colored, and therefore the filter can be preferably used in the above-mentioned applications.

It is preferable that the above-mentioned transmittance of the selectively reduced light is higher. Specifically, the transmittance is preferably 85% or more, and more preferably 90% or more. If the transmittance is low, the intensity of light passing through the light selective transmission filter is insufficiently secured. Therefore, such a filter might not be preferably used in the above-mentioned applications. With respect to the above-mentioned light selective transmission filter, it is more preferable that each transmittance of visible rays at 400 to 600 nm is 85% or more. The transmittance is more preferably 90% or more. In addition, it is preferable that the light selective transmission filter shields a desired wavelength by reflecting or absorbing it.

The configuration, embodiment, and the like of the above-mentioned light selective transmission filter are not especially limited as long as the filter has the above-mentioned functions and has a thickness of less than 200 μm. However, it is preferable that the filter has an embodiment in which a functional material layer (a light selective transmission layer, a refractive preventing layer, an equivalent refractive index film, a hard coat layer, an optical compensation layer, and the like) is formed on a base material. The functional material layer is a layer composed of a functional material. The light selective transmission layer having a function of selectively transmitting desired light and cutting other lights may have an appropriately selected configuration and the like, depending on a reduced light wavelength. For example, the functional material layer is preferably a multilayer film (also referred to as a multilayer-deposited layer, a multilayer-deposited film, or a dielectric multilayer film) having a structure formed by stacking 40 to 60 layers (6 μm) of low and high refractive index materials on a base material (on the side where light enters). Especially, it is preferable that the functional material layer has a multilayer structure if desired light is sufficiently reduced. If the functional material layer has a multilayer structure, the transmittance of each wavelength which is selectively reduced can be easily reduced to 10% or less. That is, a sharp light selective transmission filter having a high transmittance of a wavelength to be transmitted and a low transmittance of a wavelength to be reduced can be produced. Specifically, if the light selective transmission filter is an infrared cut filter which reduces transmittance of infrared rays at 780 nm to 10 μm, the transmittance is significantly changed from 780 nm. For example, the transmittance of light at less than 780 mm is 70% or more and the transmittance of light at 780 nm or more is only 10% or less. Thus, the transmittance sharply changes, and therefore, if such a filter is used in a camera module, the filter has the advantage that infrared rays can be preferentially removed from light which reaches a CMOS sensor.

In the above-mentioned light selective transmission filter including the multilayer film as a light selective transmission layer, a low refractive index material and a high refractive index material are alternately stacked to form a light selective transmission layer. The light selective transmission layer selectively reflects light at a wavelength to be reduced (for example, light in an infrared wavelength range or a UV wavelength range) and simultaneously shifts a phase of incident light and a phase of reflective light by a half wavelength, thereby selectively reducing a transmittance of light. The above-mentioned light selective transmission layer may be a light selective transmission layer including a dielectric multilayer film formed by alternately stacking a dielectric layer A and a dielectric layer B having a refractive index higher than a refractive index of the dielectric layer A (for example, an infrared-reflecting film, a UV-reflecting film, and a UV and infrared-reflecting film). If such a dielectric multilayer film is formed on at least one surface of a transparent substrate (base material), a light selective transmission filter excellent in an ability of selectively reflecting light at a desired wavelength can be produced. The light selective transmission layer may have a single-layer structure or a multilayer structure, and may be formed on one or both surfaces of the base material. The light selective transmission layer is mentioned below.

It is preferable that the above-mentioned light selective transmission filter has heat resistance. Specifically, it is preferable that the light selective transmission filter maintains its shape at 250° C. for 3 minutes or at 200° C. for 5 hours. It is more preferable that the filter maintains its shape at 250° C. for 3 minutes and 200° C. for 5 hours. It is still more preferable that the filter has enough reflow resistance to maintain its shape at 260° C. for 3 minutes or 200° C. for 5 hours. It is particularly preferable that the filter has enough reflow resistance to maintain its shape at 260° C. for 3 minutes and 200° C. for 5 hours. If the filter has reflow resistance, the light selective transmission filter can be preferably used in various applications and can be preferably used in an optical application such as a camera module.

It is preferable that the light selective transmission filter includes a base material including a functional film with reflow resistance. That is, it is preferable in the light selective transmission filter having the above-mentioned configuration that the base material (base material film) is a functional film with reflow resistance. If the light selective transmission filter is excellent in reflow resistance attributed to the functional film with reflow resistance, the light selective transmission filter exhibits sufficient heat resistance when being mounted, and therefore, the filter can be preferably used in a reflowable camera module, and the like. If a low refractive index material and a high refractive index material (for example, an inorganic oxide) are deposited, thereby forming the light selective transmission layer on the base material, the base material needs to have resistance to heat of the deposition. Also from this point, it is preferable that the base material has reflow resistance. That is, the preferable embodiments of the present invention include the light selective transmission filter, wherein the filter includes the functional film with reflow resistance as the base material, and a light selective transmission layer is formed on at least one surface of the base material. In this case, the light selective transmission layer corresponds to the above-mentioned functional material layer composed of the functional material. If the light selective transmission filter is an infrared cut filter, for example, the preferable embodiments of the present invention include the light selective transmission filter, wherein the above-mentioned light selective transmission layer is an infrared cut layer; the filter includes, as the base material, a functional film with reflow resistance; and an infrared cut layer including a dielectric multilayer film is formed on at least one surface of the base material. The infrared cut layer including a dielectric multilayer film is a layer which includes a dielectric multilayer film and selectively reduces a transmittance of infrared rays. The dielectric multilayer film is mentioned below in more detail. The functional film with reflow resistance means a film which can resist heat in a soldering process. Such a film is a reflowable film which is highly expected as a film for a next-generation camera module. Thus, the light selective transmission filter has sufficient heat resistance, and thereby the filter can be automatically mounted. Therefore, costs on mounting the filter can be sufficiently reduced, and such a filter can be preferably used in various applications.

The above-mentioned functional film with reflow resistance also means a film which maintains its shape at 250° C. for 3 minutes or 200° C. for 5 hours. The functional film with reflow resistance more preferably maintains it shape at 250° C. for 3 minutes and 200° C. for 5 hours. The functional film with reflow resistance more preferably maintains it shape at 260° C. for 3 minutes or 200° C. for 5 hours. The functional film with reflow resistance still more preferably maintains it shape at 260° C. for 3 minutes and 200° C. for 5 hours. If the film has no reflow resistance, the film is melt and loses its shape to fail to be deposited, or the film is deformed and can not be mounted. In the present invention, if the film has reflow resistance, a change in shape and size of the film after heating is 20% or less relative to those of the film before heating. The change in shape and size is preferably 5% or less and more preferably 1% or less. Further, it is preferable that the film is not curled after heating if it is evaluated by eye observation. The film maintains its shape at 250° C. for 3 minutes, which shows that the film exhibits sufficient reflow resistance when being mounted. The film maintains its shape at 200° C. for 5 hours, which shows that the film exhibits sufficient reflow resistance when the functional material layer is stacked on the base material of the light selective transmission filter by deposition.

"Base Material"

The material for the base material constituting the above-mentioned light selective transmission filter is not especially limited. Any of an organic material, an inorganic material, an organic-inorganic composite material may be used. One or more species of them may be used. Substrates which are easy to handle are preferable as the above-mentioned organic material. Substrates excellent in transparency and thermal expansion coefficient (high transparency and small thermal expansion coefficient) are preferable as the above-mentioned inorganic material (for example, glass). Substrates having both of the above-mentioned characteristics are preferable as the above-mentioned organic and inorganic composite material. Any of these materials may be preferably used, but it is preferable that such materials have reflow resistance. Specifically, it is preferable that the material for the base material includes at least one selected from the group consisting of (1) a fluorinated aromatic polymer (2) a polycyclic aromatic polymer (3) a polyimide resin (4) a fluorine-containing polymer compound (5) an epoxy resin and (6) a glass film. Thus, the preferable embodiments of the present invention include the light selective transmission filter including, as the base material, at least one selected from the group consisting of a fluorinated aromatic polymer, a polycyclic aromatic polymer, a polyimide resin, a fluorinated polymer compound, an epoxy resin, and a glass film.

With the above-mentioned (1) to (6), particularly preferable examples are given below.

Preferable examples of the (1) fluorinated aromatic polymer include polyether ketone represented by the following formula (1):

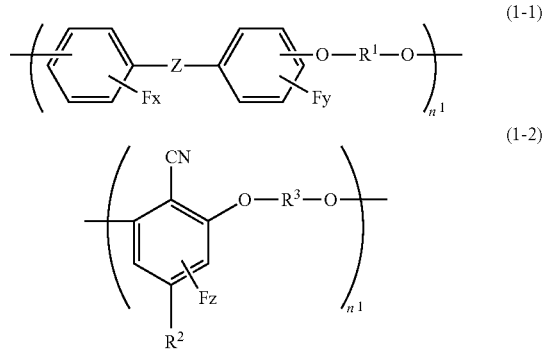

(in the above formula (1-1), $R^1$ representing a divalent organic chain including an aromatic ring having 1 to 150 carbon atoms; Z representing a divalent chain or a direct bond; x and y being an integer of 0 or more; x+y satisfying 1 to 8 and being the same or different and representing the number of a fluorine atom bonded to the aromatic ring; and $n^1$ representing a polymerization degree, preferably representing 2 to 5000, and more preferably 5 to 500, and in the above-mentioned formula (1-2), $R^2$ representing a $C_{1-12}$ alkyl group, a $C_{1-12}$ alkoxy group, a $C_{1-12}$ alkylamino group, a $C_{1-12}$ alkylthio group, a $C_{6-20}$ aryl group, a $C_{6-20}$ aryloxy group, a $C_{6-20}$ arylamino group, or a $C_{6-20}$ arylthio group, which each may include a substituent; $R^3$ representing a divalent organic chain having a $C_{1-150}$ aromatic ring; z representing the number of a fluorine atom bonded to the aromatic ring and representing 1 or 2; and $n^1$ representing a polymerization degree and preferably representing 2 to 5000 and more preferably 5 to 500). Fluorinated polyether ketone (FPEK) is particularly preferable.

Examples of the (2) polycyclic aromatic polymer include polyethylene naphthalate (PEN) represented by the following formula (2):

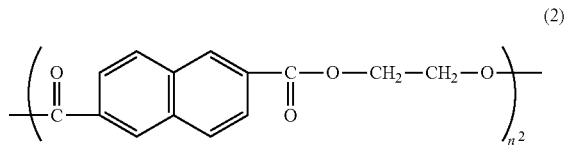

in the formula, $n^2$ representing the repeating number and being an integer of 2 to 1000. Specifically, Teonex Q83, product of Teijin Dupont Films Ltd., having a thickness of 25 μm or 75 μm and a fusing point of 269° C. may be mentioned.

Examples of the (3) polyimide resin include a polyimide resin represented by the following formula (3):

in the formula, $n^3$ being an integer of 0 to 4; $p^3$ being 0 or 1; and $n^+ + p^3$ being an integer of 1 to 5. Specifically, Neopulim L-3430, product of MITSUBISHI GAS CHEMICAL COMPANY, INC., having a thickness of 50 μm or 100 μm, may be mentioned.

Examples of the (4) fluorine-containing polymer compound include a fluorinated polyimide resin (F-PI) (thickness of 50 μm) representing the following formula (4):

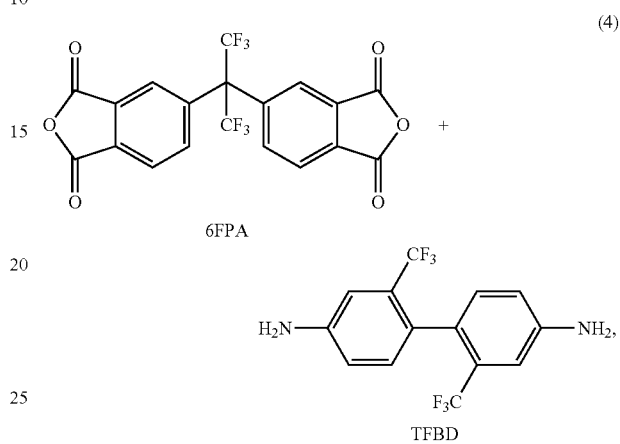

which is obtained by heating a polymer solution obtained by reacting 4,4'-hexafluoropropylidene bisphthalic acid dianhydride (6FPA) with 2,2'-bis(trifluoromethyl)-4,4'-diaminobiphenyl (TFBD); and PFA films such as a tetrafluoroethylene/perfluoroalkyl vinyl ether copolymer, NEOFLON™ film PFA with a thickness of 50 μm, product of DAIKIN INDUSTRIES, Ltd., and Naflon PFA sheet, T/# 9000-PFA, product of NICHIAS Corp. (especially, NEOFLON™ film PFA with a thickness of 50 μm, product of DAIKIN INDUSTRIES, Ltd. is preferable).

Preferable examples of the (5) epoxy resin include a thermally curable epoxy resin composition and a photocurable epoxy resin composition. Specifically, fluorene epoxy (ONCOAT EX-1), product of Osaka Gas Chemicals Co., Ltd., bisphenol A epoxy resin (Epicoat 828EL), product of Japan Epoxy Resins Co., Ltd., hydrogenated bisphenol A epoxy resin (Epicoat YX 8000), product of Japan Epoxy Resins Co., Ltd., and cyclic liquid epoxy resin (CELLOXIDE 2021), product of DICEL CHEMICAL INDUSTRIES, LTD., are preferable.

It is preferable that the epoxy resin includes a component with flexibility (flexible component). Specifically, YED-216D produced by Japan Epoxy Resins Co., Ltd., YL-7217 produced by Japan Epoxy Resins Co., Ltd., YL-7170 produced by Japan Epoxy Resins Co., Ltd., EHPE-3150 produced by DICEL CHEMICAL INDUSTRIES, LTD., and CELLOXIDE 2081 produced by DAICEL CHEMICAL INDUSTRIES, LTD are preferable.

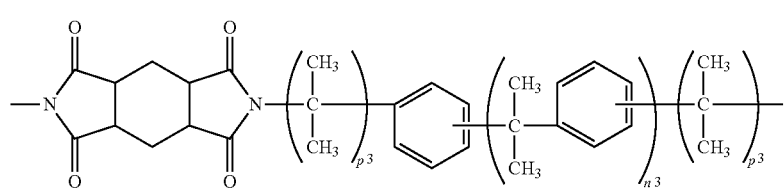

As the (6) glass film, glass code: D263 with a thickness of 30 μm, produced by SCHOTT AG, may be mentioned. The details of the materials (1) to (6) constituting the light selective transmission filter are mentioned below.

One or more species of the above-mentioned materials for the base material may be preferably used. If two or more species of them are used, the materials may be mixed or stacked to be used. If the base material has a multilayer structure of two or more stacked materials, a plurality of characteristics or the used materials is exhibited. Therefore, such a base material can be preferably used. For example, if the base material formed by stacking an organic material on one or both surfaces of an inorganic material is used, the base material is not deformed when the functional material layer is further stacked on the base material. Therefore, such a filter can be preferably used as an optical member. Specifically, an embodiment in which the organic resin is formed on one or both surfaces of the glass film is preferable. An embodiment in which the organic resin is formed on both surfaces of the glass film is more preferable. In order to prevent cracks, the functional material layer is stacked and thereon an organic substance is stacked.

The thickness of the above-mentioned base material may be appropriately determined depending on the shape of the light selective transmission filter. The base material generally has a film shape.

If the above-mentioned materials (1) to (6) are used as the base material, a film can be obtained by a commonly used method. For example, the resin materials (1) to (5) are formed as a film by a solution casting method, a melt-molding method, and the like. The glass film (6) can be obtained by cast molding, coating, and the like.

Any of the above-mentioned materials can be preferably used as the above-mentioned base material. However, it is preferable that the inorganic material is used in combination with the organic material and/or the organic-inorganic composite material if the light selective transmission filter is used in an application such as a camera module which needs to include a thinned light selective transmission filter having a thickness of less than 200 μm, more preferably 100 μm or less. If the light selective transmission filter is used in an optical application such as a camera module, not only sufficiently reduced thickness and excellent light selective transmissivity, but also excellent strength or flexibility is needed for such a light selective transmission filter. Also for the base material constituting the light selective transmission filter, excellent strength or flexibility is needed. A light selective transmission filter including only an inorganic material, for example, glass as the base material might be insufficient in strength or flexibility when used in an optical application. Accordingly, if an inorganic material is used as the base material, an embodiment in which the inorganic material is used together with another material in order to thin the light selective transmission filter, thereby sufficiently decreasing the focal length and simultaneously improving the strength or flexibility is preferable. If the inorganic material is used together with another material, the base material is neither broken during transport nor cracked when formed or incorporated into a device, or in a later step of forming a multilayer or providing a functional property. Therefore, such a base material is excellent in workability. For example, if glass which is thinned to have a thickness of 150 μm or less is used together with an organic material as the base material, such a base material has sufficiently excellent strength, flexibility, and workability in comparison to only glass. Therefore, a light selective transmission filter including such a base material can be preferably used in an optical application.

"Base Material Excellent in Adhesion"

It is preferable that the above-mentioned base material includes, among the above-mentioned (1) to (6), at least one selected from (1) the fluorinated aromatic polymer, (2) the polycyclic aromatic polymer, (3) the polyimide resin, and (5) the epoxy resin, from viewpoint of excellent adhesion to an adjacent layer (for example, the light selective transmission layer). Specifically, FPEK (fluorinated aromatic polymer) PEN (polycyclic aromatic polymer), polyimide (polyimide resin), and epoxy resin (epoxy resin) are preferable. PEN is more preferable.

If the above-mentioned resin film is used as the above-mentioned base material and, for example, an inorganic layer is deposited as the functional material layer, a deposition film having excellent adhesion between the deposition layer and the base material can be produced. Thus, the preferable embodiments of the present invention include a light selective transmission filter including a functional material layer and a base material, wherein the base material includes at least one selected from the group consisting of a fluorinated aromatic polymer, a polycyclic aromatic polymer, a polyimide resin, and an epoxy resin. The functional material layer can be appropriately selected from the below-mentioned layers.

The particularly preferable embodiment of the above-mentioned light selective transmission filter includes a stacked film including a light selective transmission layer and a base material (resin film), wherein the resin film includes at least one selected from epoxy resin, FPEK, polyimide, and PEN. According to this, a light selective transmission filter having excellent adhesion between the light selective transmission layer and the resin film can be produced. PEN is more preferably used as the resin film. In such a case, the adhesion to the light selective transmission layer can be more improved. With respect to the material constituting the light selective transmission layer, a dielectric multilayer film is preferably used. Silica, titania and the like are more preferably used. It is more preferable in view of adhesion that silica or titania is used as the light selective transmission layer and PEN is used as the resin film. The thickness of the above-mentioned light selective transmission layer is preferably 150 nm or more and more preferably 1.5 μm or more.

It is preferable that the above-mentioned base material has heat resistance. With respect to the heat resistance temperature of the base material, the 10% decomposition temperature is 200° C. or more, and more preferably 250° C. or more, and still more preferably 300° C. or more, and most preferably 350° C. or more. The base material preferably has a glass transition temperature (Tg) of 80° C. or more, and more preferably 150° C. or more, and still more preferably 200° C. or more, and most preferably 250° C. or more.

As long as the above-mentioned resin film having heat resistance exhibits the above-mentioned heat resistance as the whole base material, the structure or constituent material for the base material is not especially limited. Both of the above-mentioned single-layer structure and the above-mentioned multilayer structure can be preferably employed as the structure of the base material. It is preferable that the material constituting the base material can be appropriately selected from the above-mentioned materials to be used. It is preferable that the organic material included in the heat-resistant resin film has heat resistance.

"Heat Treatment for Base Material"

It is preferable that the above-mentioned base material includes an organic material in view of processability, moldability, flexibility, economic efficiency, strength (hard to crack), and the like. Specifically, a resin film composed of the resin material such as the materials (1) to (5) among the above-mentioned materials (1) to (6). If the resin film is used, a complicated process which cannot be performed for an inorganic material such as glass can be performed at low costs.

"Base Material Excellent in Heat Resistance"

It is preferable that the base material is a heat-treated resin film. That is, it is preferable that the above-mentioned light selective transmission filter includes a heat-treated resin film. The heat-treated resin film has excellent heat resistance and therefore, a light selective transmission filter which is hardly deformed by heat can be produced. The heat treatment means heat pressing, heat rolling, stretching treatment, and the like. The light selective transmission filter might be heated when used in various applications. For example, in an optical application such as a lens unit, the filter is generally loaded (mounted) by soldering. The use of the heat-treated resin film as the base material is preferable. This is because the filter is sufficiently suppressed from being deformed by heat during loading and therefore it is not curled. That is, such a light selective transmission filter can overcome the heat deformation problem if the functional material layer is formed on the heat-treated resin film. The heat treatment provides effects such as improvements in mechanical strength, heat resistance, and adhesion of the resin film.

With respect to the heat treatment conditions, it is preferable that the treatment temperature is around Tg or more. The treatment temperature is more preferably Tg or more and still more preferably between a temperature around Tg and a temperature around Tg+150° C., and particularly preferably between Tg and Tg+150° C. The "temperature around Tg" means a temperature within 15° C. from the glass transition temperature. Thus, the preferable embodiments of the present invention include the light selective transmission filter selectively transmitting light, wherein the functional material layer is formed on the heat-treated base material.

It is preferable that the above-mentioned light selective transmission filter including the heat-treated resin film as the base material includes a light selective transmission layer on at least one surface of the base material. The above-mentioned light selective transmission layer can be appropriately selected from the below-mentioned materials depending on the application and the wavelength whose transmittance is reduced. For example, if infrared rays and/or UV rays are/is reduced, it is preferable that an inorganic material constitutes the light selective transmission layer.

If the above-mentioned light selective transmission layer is an inorganic layer composed of an inorganic material, it is preferable that the inorganic layer is formed by a gas phase method. A vacuum deposition method, a sputtering method and the like are preferable as the above-mentioned gas phase method. Among these, a vacuum deposition method is more preferable. The above-mentioned inorganic layer is preferably a multilayer film. Thus, if the above-mentioned light selective transmission layer is composed of an inorganic material, a multilayer deposition film is preferable. Further, a crystalline film is more preferable than an amorphous film. A more preferable embodiment of the light selective transmission layer is a multilayer deposition film including a crystalline inorganic layer.

A particularly preferable embodiment of the above-mentioned light selective transmission filter is a stacked film obtained by forming the light selective transmission layer on at least one surface of a base material essentially including a resin film, wherein the base material is heat-treated before the light selective transmission layer is formed. According to this, the heat resistance of the base material can be improved, which can suppress the resin film after the light selective transmission layer is formed from being thermally deformed (curled). The heat treatment provides effects such as improvements in mechanical strength, heat resistance, and adhesion of the resin film. If the light selective transmission filter is used in a lens unit, a resin film with reflow resistance is more preferably used. That is, it is preferable that the light selective transmission filter includes a heat-treated functional film with reflow resistance. According to this, the heat resistance can be more improved. Those mentioned above are preferable as the resin film with reflow resistance.

It is preferable that the above-mentioned light selective transmission filter is obtained by forming a functional material layer by a gas phase method, on a base material which is heat-treated under the above-mentioned conditions. That is, the preferable embodiments of the present invention include a method for producing a light selective transmission filter including a functional material layer on a heat-treated base material, wherein the base material is heat treated at a temperature of around Tg or more and the functional material layer is formed by a gas phase method.

It is preferable that the above-mentioned method for producing the light selective transmission filter including the functional material layer on at least one surface of the base material including the resin film includes a step of heat-treating the resin film before a step of forming the functional material layer on the base material including the resin film. Further, it is preferable that the above-mentioned method for producing the light selective transmission filter includes a step of forming the functional material layer by a gas phase method after the resin film is heat-treated at a temperature around Tg or more. The temperature of the heat treatment and the gas phase method are as mentioned above. It is preferable that the above-mentioned functional material layer serves as the light selective transmission layer in view of improvement in light selective transmissivity of the light selective transmission filter.

"Method for Forming Functional Material Layer on Base Material"

The above-mentioned method for forming the functional material layer on the base material is not especially limited as long as the base material and the functional material layer attached thereto can be used together as a light selective transmission filter. If the light selective transmission layer is formed on the base material, a base material film is placed in a deposition apparatus and the like, and on the base material (on one or both surfaces), the light selective transmission layer is formed by deposition, thereby being attached to the base material. Then, a part including the base material and the light selective transmission layer (a part where the light selective transmission layer is formed on the base material) is appropriately cut in a needed size. As a result, a light selective transmission filter is prepared. From viewpoint of economic efficiency, it is preferable that an area of the light selective transmission layer on the base material is large (a difference in the area between the base material and the light selective transmission layer is small) because the large number of the light selective transmission filters can be clipped. In order to improve the uniformity of the light selective transmittance of the light selective transmission layer, it is preferable that the area of the light selective transmission layer on the base material is small because the thickness or smoothness of the light selective transmission layer is not varied. It is preferable that the size of the base material and the area or shape of the light selective transmission layer formed on the base material are appropriately determined from the above-mentioned viewpoint.

The light selective transmission filter can be clipped by laser cut, a punching method, dicing cut, and the like. The punching method is more preferable in view of mass production.

It is preferable that an organic material is used for the base material because no chips, cracks, and the like of the base material are generated regardless of the clipping method. Further, if an organic material is used for the base material, the light selective transmission filter can be clipped into a circular or polygonal shape, although the clipping into such a shape is difficult in the case where an inorganic material is used for the base material. From the above, it is most preferable that the light selective transmission layer is deposited on a base material composed of an organic material and the light selective transmission filter is clipped by a punching method. That is, the preferable embodiments of the present invention include a method for producing a light selective transmission filter selectively reducing light at a desired wavelength, wherein the method includes steps of: forming a light selective transmission layer on a base material including an organic material; and clipping the light selective transmission filter by punching the base material on which the layer is deposited.

"Formation Method of Functional Material Layer"

It is preferable in the above-mentioned light selective transmission filter that the light selective transmission filter has a structure in which a functional material non-stacking part is formed around a functional material-stacking part when the functional material is stacked on the base material. That is, it is preferable that the light selective transmission filter has an edge where the functional material layer is not stacked (also referred to as a functional material layer non-formation part), which is formed around a functional material layer-stacking part (also referred to as a functional material layer formation part) when the functional material layer is stacked on the base material. Thus, the preferable embodiments of the present invention include a light selective transmission filter essentially including a base material and a functional material layer, wherein the light selective transmission filter has the edge where the functional material layer is not stacked, which is formed around the functional material layer-stacking part when the functional material layer is stacked on the base material. For example, if the functional material is stacked on the entire base material and the above-mentioned edge is not formed, the functional material stacked on the end of the base material might be separated during or after stacking. Also if the base material is provided with a hole for fixing, the functional material might be separated from the surrounding of the hole. This might be because if the functional material is stacked on the end of the base material, the surrounding of the hole, side surfaces other than the upper surface (smooth surface) of the base material and the like, the adhesion of the functional material is reduced, which causes the separation. If the functional material non-formation part is formed along the end of the base material or the surrounding of the hole, the functional material layer is suppressed from being separated.

A particularly preferable embodiment of the above-mentioned light selective transmission filter is a stacked film including the light selective transmission layer on at least one surface of the base material, wherein the light selective transmission layer non-formation part (edge) is formed on the surface of the base substrate when the light selective transmission layer is stacked. That is, it is preferable that the filter includes an edge where the light selective transmission layer is not stacked, which is formed around the light selective transmission layer-stacking part when the light selective transmission layer is stacked.

It is preferable that a material for preventing adhesion of the functional material layer, such as a screen and a tape for deposition, is used to form the edge where the functional material layer is not stacked (also referred to as a functional material layer non-formation part). That is, it is preferable that the surrounding of the functional material layer-stacking part is shielded with a screen, a tape for deposition and the like, and then the functional material is stacked. Thus, the preferable embodiments of the present invention include a method for producing a light selective transmission filter essentially including a base material and a functional material layer (for example, a light selective transmission layer), wherein a screen or a tape for deposition is used to form a functional material layer non-formation part. Those mentioned below can be preferably used as the material for the functional material layer, the formation method, and the like. Among these, a vacuum deposition method and a sputtering method are preferable as the formation method.

It is preferable that the light selective transmission filter has a structure in which a functional material is stacked on both surfaces of the base material. Such a light selective transmission filter including, on the both surfaces, the functional material layer formed by stacking the functional material can obtain more quality functions. Thus, the preferable embodiments of the present invention include a light selective transmission filter both surfaces of which have functions. If the functional material is stacked by deposition, the filter can be suppressed from being curled during deposition and/or mounting because the material is deposited on both surfaces. Therefore, such a light selective transmission filter can be more preferably used in various applications. The above-mentioned functional material layer can be appropriately selected depending on the function to be provided for the light selective transmission filter. It can be appropriately selected from a light selective transmission layer, a layer with toughness, a buffer layer which absorbs stress on the light selective transmission filter and the like (an intermediate layer, a stress-relaxation layer), a reinforcing layer, a hydrophilic layer, a water-shedding layer, an anti-reflection layer, a retardation layer, a refractive index-adjusting layer, a cohesion layer, a conductive layer, an insulating layer, an optical compensation layer, and the like. If the functional material layer as well as the light selective transmission layer are formed, a layer having a thermal expansion coefficient intermediate between that of the base material and that of the light selective transmission layer may be further stacked.

In the above-mentioned light selective transmission filter, the functional materials which are stacked on both surfaces of the base material may be the same or different. Among the above-mentioned embodiments, preferable embodiments include an embodiment (1) in which the light selective transmission layer is stacked on both surfaces, an embodiment (2) in which the light selective transmission layer is stacked on one surface and a reflection preventing layer is stacked on the other surface, and an embodiment (3) in which the light selective transmission layer is stacked on one surface and a reflection preventing layer/light selective transmission layer is stacked on the other surface. Among these embodiments, the embodiment (1) is preferable. It is preferable that the above-mentioned functional material layers are stacked in such a way that their respective functions are most highly exhibited. In the present invention, the light selective transmission layer is appropriately selected, thereby reducing a transmittance at a desired wavelength. For example, if infrared rays is reduced, the light selective transmission layer is an infrared cut layer in the above-mentioned embodiments (1) to (3).

"Embodiment in which Light Selective Transmission Filter is Excellent in Heat Resistance"

It is preferable that the above-mentioned light selective transmission filter is a light selective transmission filter including a functional film with reflow resistance (for example, a resin film with reflow resistance) and a functional material layer stacked on both surfaces of the functional film. Such a light selective transmission filter including a functional film with reflow resistance as the base material and a functional material layer stacked on both surfaces of the base material can obtain more improved heat resistance. If the functional material layer is a light selective transmission layer, the light selective transmission layer is not especially limited as long as it selectively reduces a transmittance of light. The light selective transmission layer may be a single layer or a multilayer film.

It is preferable that the formation temperature of the above-mentioned functional material layer is less than 120° C. The formation temperature is more preferably 100° C. or less and still more preferably 90° C. or less. According to this, damages to the base material (the functional film with reflow resistance) can be reduced. A fluorinated aromatic polymer, a polycyclic aromatic polymer, a polyimide resin, a fluorine-containing polymer compound, and an epoxy resin are preferable as the functional film with reflow resistance that is used as the base material. According to this, the light selective transmission filter can obtain higher heat resistance. Further, it is preferable that a method for producing the above-mentioned light selective transmission filter including the functional film with reflow resistance and the functional material layer stacked on both surfaces of the functional film includes a step of forming the functional material layer at less than 120° C. That is, it is preferable that the light selective transmission filter has a structure in which the functional material is stacked on the base material at less than 120° C. The functional material is stacked more preferably at 100° C. or less and still more preferably at 90° C. or less.

"Preferable Embodiment of Light Selective Transmission Filter"

The light selective transmission filter of the present invention preferably has the above-mentioned configuration. The wavelength whose transmittance is selectively reduced may be appropriately selected depending on the application. Preferable embodiments of the light selective transmission filter include an embodiment in which a transmittance of infrared rays is selectively reduced, an embodiment in which a transmittance of UV rays is selectively reduced, and an embodiment in which both transmittances of infrared rays and UV rays are selectively reduced. Specifically, an infrared cut filter, a UV cut filter, a UV and infrared cut filter may be mentioned.

The above-mentioned infrared cut filter (also referred to as an infrared cut filter, or an IR cut filter) is a filter which has a function of selectively reducing (shielding) infrared ray by absorbing or reflecting it. The infrared cut filter is a filter having a function of selectively reducing light transmission at any wavelengths of light at a wavelength of 780 nm to 10 μm in infrared region. The range of the wavelength which is selectively reduced is preferably 780 μm to 2.5 μm, 800 nm to 1 μm, or 1 to 1.5 μm. The filter which selectively reduces at least one wavelength within such a range is included in the infrared cut filter of the present invention. The range of the wavelength which is selectively reduced is preferably 780 nm to 2.5 μm in a near-infrared region.

It is preferable that the transmittance of the above-mentioned selectively reduced wavelength and the transmittance of other wavelengths are the same as those mentioned above, respectively. That is, it is preferable that the infrared cut filter selectively reduces a transmittance of infrared rays at 780 nm to 1000 nm to 5% or less. The transmittance of other wavelengths is preferably 75% or more. However, only the transmittance in a specific wavelength region may be high depending on the application in which the filter is used. For example, if the above-mentioned infrared cut filter is used as a camera module, it is preferable that the transmittance of infrared rays is 5% or less and the transmittance of visible rays (at 380 to 780 nm) is 90% or more. It is more preferable that the transmittance of visible rays at a wavelength of 400 to 600 nm is 90% or more. More preferably, the transmittance of visible rays at a wavelength of 350 to 700 nm is 90% or more. In the infrared cut filter of the present invention, the transmittance of other wavelengths (wavelengths in a region other than the infrared region) is more preferably 85% or more, and still more preferably 90% or more. If the light selective transmission filter includes an infrared cut layer, it is preferable that the transmittance of the wavelength the infrared cut layer selectively reduces and the transmittance of other wavelengths are the same as those of the above-mentioned infrared cut filter, respectively. The preferable embodiments of the present invention include an infrared cut filter including an infrared cut layer having a dielectric multilayer film.

The above-mentioned UV cut filter is a filter having a function of shielding UV rays. The range of the selectively reduced wavelength is preferably 350 nm or less. The wavelength is more preferably 380 nm or less.

It is preferable that the transmittance of the above-mentioned selectively reduced wavelength and the transmittance of other wavelengths are the same as those mentioned above, respectively. Specifically, it is preferable that the transmittance of UV rays at 350 nm or less is 5% or less. More specifically, the transmittance of UV at 380 nm or less is 5% or less.

The above-mentioned UV and infrared cut filter is a filter having a function of shielding both of UV rays and infrared rays. It is preferable that the range and transmittance of the selectively reduced wavelength, and the transmittance of other wavelengths are the same as those mentioned above, respectively.

In the above-mentioned UV and infrared cut filter, it is preferable that the transmittance of light other than infrared rays and UV rays is higher. Specifically, it is preferable that the transmittance of visible rays (380 nm to 780 nm) is 70% or more. Further, it is preferable that the transmittance of visible rays in each wavelength region is uniform in order to prevent coloring of light which has passed through the UV and infrared cut filter. It is particularly preferable that the transmittance of light at each wavelength of 400 to 600 nm is 85% or more. The transmittance is more preferably 90% or more. With respect to the function of shielding infrared rays, it is preferable that the UV and infrared cut filter shields infrared rays by reflecting or absorbing it. More preferably, the UV and infrared cut filter mainly reflects infrared rays. It is further preferable that the UV and infrared cut filter shields at least light at a wavelength of 800 to 1000 nm.

The above-mentioned UV and infrared cut filter is particularly preferably used as a filter for shielding optical noise in an image lens. If the UV and infrared cut filter is used for shielding optical noise in an image lens and the like, it is preferable that the transmittance of light at each wavelength of 400 to 600 nm in the visible rays region is 85% or more. More preferably, the transmittance is 90% or more. It is preferable that the transmittance of UV rays at 350 nm or less in the UV region is less than 5%. It is particularly preferable that the transmittance of UV rays at 380 nm or less is less than 5%. In the infrared region, it is preferable that light at a wavelength of 800 nm to 1 µm is shielded. Specifically, it is preferable that the transmittance at 800 nm to 1 µm is 5% or less. More preferably, the transmittance at 800 nm to 1.5 µm is 5% or less. Still more preferably, the transmittance at 800 nm to 2.5 µm is 5% or less.

"Lens Unit"

The present invention is a lens unit including the light selective transmission filter and a lens. Such a lens unit can be downsized and thinned because the use of the above-mentioned light selective transmission filter shortens the light path length. Therefore, such a lens unit can be preferably used in various applications such as a camera module. It is preferable that the length of the lens unit is 120 or less if the length of the lens unit without the light selective transmission filter is defined as 100. The length is more preferably 110 or less and still more preferably 105 or less.

In the above-mentioned lens unit, it is preferable that the lens has reflow resistance (reflow lens). The light selective transmission filter may be any of the above-mentioned filters, but preferably, it has reflow resistance. Thus, the preferably embodiments of the present invention include an embodiment in which each of the light selective transmission filter and the lens constituting the lens unit has reflow resistance. If each of the light selective transmission filter and the lens has sufficient heat resistance, they can be automatically mounted, which sufficiently reduces costs on the mounting. Therefore, such a lens unit can be preferably used in an optical application such as a camera module.

It is preferable that the above-mentioned lens has an Abbe number of 45 or more. If the lens has an Abbe number of 45 or more, dispersion of light becomes smaller, and a resolution is increased. Therefore, the lens can be excellent in optical characteristics. If the lens has an Abbe number of less than 45, blurring (occurrences of aberration) might be observed, and sufficient optical characteristics are not exhibited, for example. Therefore, such a lens might not be preferably used in a lens unit. The above-mentioned Abbe number is more preferably 50 or more. It is preferable that the lens unit includes one or more lens having an Abbe number of 50 or more. The above-mentioned Abbe number is still more preferably 55 or more, and particularly preferably 58 or more, and most preferably 60 or more. The above-mentioned lens unit includes one or more lenses. If the lens unit includes one lens, the Abbe number of the lens is preferably 45 or more. If the lens unit includes two or more lenses, the lenses may have an Abbe number of less than 45 as long as at least one of them has an Abbe number of 45 or more. If the lens having an Abbe number of 45 or more and the lens having an Abbe number of less than 45 are used in combination, an embodiment in which a lens having an Abbe number of 50 or more and a lens having an Abbe number of 40 or less are used in combination is preferable. The combination use of the lens having an Abbe number of 50 or more with the lens having an Abbe number of 40 or less has the advantage of improving the resolution and satisfying the characteristics needed for the lens unit.

It is preferable that the lens has a thickness of less than 1 mm. If the lens has a thickness (the maximum thickness in a region where an image is reflected) of less than 1 mm and further, the light selective transmission filter having a thickness of less than 200 µm is used, the optical path length can be shortened. As a result, the lens unit can be more downsized. The thickness of the lens is more preferably less than 800 µm, and still more preferably less than 500 µm. It is more preferable that the light selective transmission filter having a thickness of 100 µm or less is used.

It is preferable that a heat-resistant material with reflow resistance is used as a material for the above-mentioned lens. Specifically, any of an organic material, an inorganic material, an organic and inorganic composite material may be used. One or more species of them may be used. An organic resin is preferable as the organic material. A thermally curable resin composition is more preferable. Glass and the like is preferable as the inorganic material. An organic-inorganic composite resin composition is preferable as the organic-inorganic composite material. Among these, the organic-inorganic composite resin composition is more preferable.

A composition including an organic resin and inorganic fine particles or a metalloxane polymer is preferable as the above-mentioned organic-inorganic composite resin composition. Preferable embodiments of the organic resin include embodiments in which the organic resin has an Abbe number of 45 or more; the organic resin is a thermally curable resin; the organic resin essentially includes an alicyclic epoxy compound; and the organic resin has a molecular weight of 700 or more. Preferable embodiments of the inorganic fine particles include embodiments in which the inorganic fine particles are metal oxide fine particles; the inorganic fine particles are obtained by a wet process; the inorganic fine particles have an average particle diameter of 400 nm or less; a solution into which the inorganic fine particles are dispersed has a pH at 25° C. of 3.4 to 11. Preferable embodiments of the organic-inorganic composite resin composition include embodiments in which the composition has an unsaturated bond of 10% by weight or less; and the composition has a flexible component. An organosiloxane polymer is preferable as the metalloxane polymer. Examples of the organosiloxane polymer include polysilsesquioxane having a cage or rudder structure, and the like; and chain polysiloxane having a basic repeating unit, such as a diphenylsiloxane unit, a dialkylsiloxane unit, and an alkylphenylsiloxane unit.

It is preferable that the above-mentioned lens unit includes the above-mentioned light selective transmission filter and two or more lenses, and the two or more lenses are reflow-resistant lenses each having a thickness of less than 1 mm, and at least one of the two or more lenses has an Abbe number of 50 or more. It is preferable that the above-mentioned lens unit has a thickness of 50 mm or less. The lens unit having such a thickness can be preferably used in various optical members such as a camera module. The thickness of the lens unit is more preferably 30 mm or less and still more preferably 10 mm or less.

A distance between a CMOS sensor and the lens is also important in view of downsizing of the above-mentioned lens unit. The distance between the CMOS sensor and the lens means a distance between the outermost surface of the lens and the CMOS sensor. If the light selective transmission filter is mounted on the CMOS sensor side, the above-mentioned distance means a distance between the light selective transmission filer and the CMOS sensor.

The above-mentioned lens unit preferably has an embodiment in which the light selective transmission filter is arranged on the CMOS sensor side as in FIG. 1, for example. The light selective transmission filter may be arranged between the lenses. In order to sufficiently shield light at a desired wavelength, an embodiment in which the filter is arranged on both of the upper and the lower sides of the lens, that is, an embodiment in which the light selective transmission filter, one or more lenses, the light selective transmission filter, and the CMOS sensor are arranged in this order in the moving direction of light, is also preferable.

The above-mentioned lens unit is not especially limited as long as the operation and effects of the present invention are exhibited. The lens unit may include a configuration other than the above-mentioned configuration.

"Material for Base Material"

(1) a fluorinated aromatic polymer, (2) a polycyclic aromatic polymer, (3) a polyimide resin, (4) a fluorine-containing polymer compound, (5) an epoxy resin, and (6) a glass film, which can be preferably used as the base material of the light selective transmission filter of the present invention, are mentioned below. These materials may be used singly or stacked. Alternatively, these materials may be used as a mixture to maintain the transparency. In this case, these materials in liquid form may be mixed.

(1) Fluorinated Aromatic Polymer

Examples of the above-mentioned fluorinated aromatic polymer include polymers including at least one fluorine group-containing aromatic ring and a repeating unit including at least one bond selected from the group consisting of an ether bond, a ketone bond, a sulfone bond, an amide bond, an imide bond, and an ester bond. Specific examples thereof include fluorine atom-containing polyimide, polyether, polyetherimide, polyetherketone, polyethersulfone, polyamidether, polyamide, polyethernitrile, and polyester.

The composition of the present invention may contain one or more species of these fluorinated aromatic polymers.

Among these, a polymer including at least one fluorine group-containing aromatic ring and a repeating unit including an ether bond as essential sites is preferable as the fluorinated aromatic polymer of the present invention. A fluorine atom-containing polyarylether including a repeating unit represented by the following formula (1-1) or (1-2) is more preferable. The repeating units represented by the formula (1-1) or (1-2) may be the same or different and may be added randomly, in block, and the like.

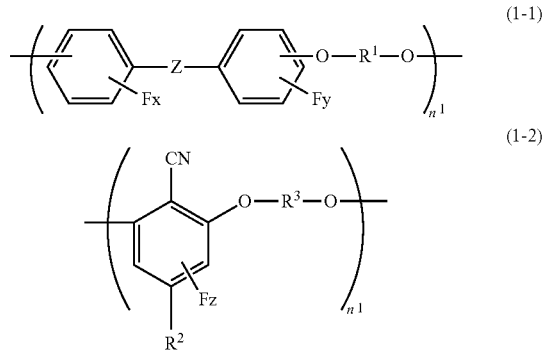

In the above-mentioned formula (1-1), $R^1$ represents a divalent organic chain including an aromatic ring containing 1 to 150 carbon atoms; Z represents a divalent chain or a direct bond; each x and y is an integer of 0 or more; x+y satisfies 1 to 8; x and y are the same or different and each represent the number of a fluorine atom bonded to the aromatic ring; $n^1$ represents a polymerization degree and it is preferably within a range of 2 to 5000 and more preferably within a range of 5 to 500.

In the above-mentioned formula (1-2), $R^2$ represents a $C_{1-12}$ alkyl group, a $C_{1-12}$ alkoxy group, a $C_{1-12}$ alkylamino group, a $C_{1-12}$ alkylthio group, a $C_{6-20}$ aryl group, a $C_{6-20}$ aryloxy group, a $C_{6-20}$ arylamino group, or a $C_{6-20}$ arylthio group, which each may include a substituent; $R^3$ represents a divalent organic chain having an aromatic ring containing 1 to 150 carbon atoms; z is the number of a fluorine atom bonded to the aromatic ring and it is 1 or 2; $n^1$ represents a polymerization degree and it is preferably within a range of 2 to 5000, and more preferably within a range of 5 to 500.

In the above formula (1-1), x+y is preferably within a range of 2 to 8, and more preferably within a range of 4 to 8. It is preferable that the ether structure part (—O—$R^1$—O—) is bonded to the aromatic ring at the para position relative to the Z.

In the above-mentioned formula (1-1) and (1-2), each of $R^1$ and $R^3$ represents a divalent organic chain, and preferably represents any one or a combination of organic chains represented by the following structural formula group (5).

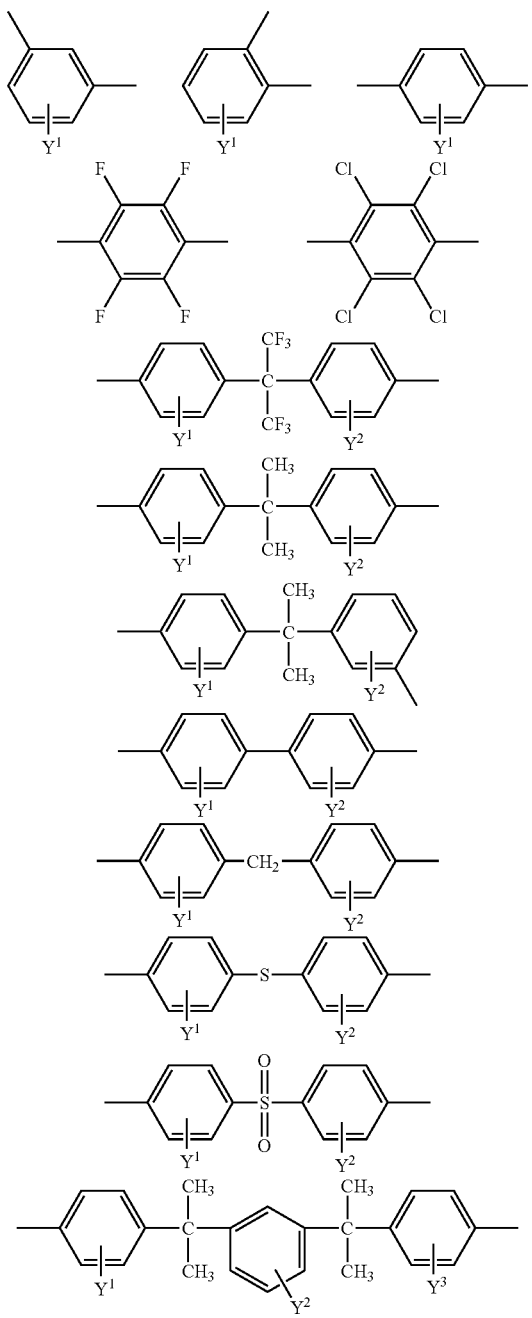

(5)

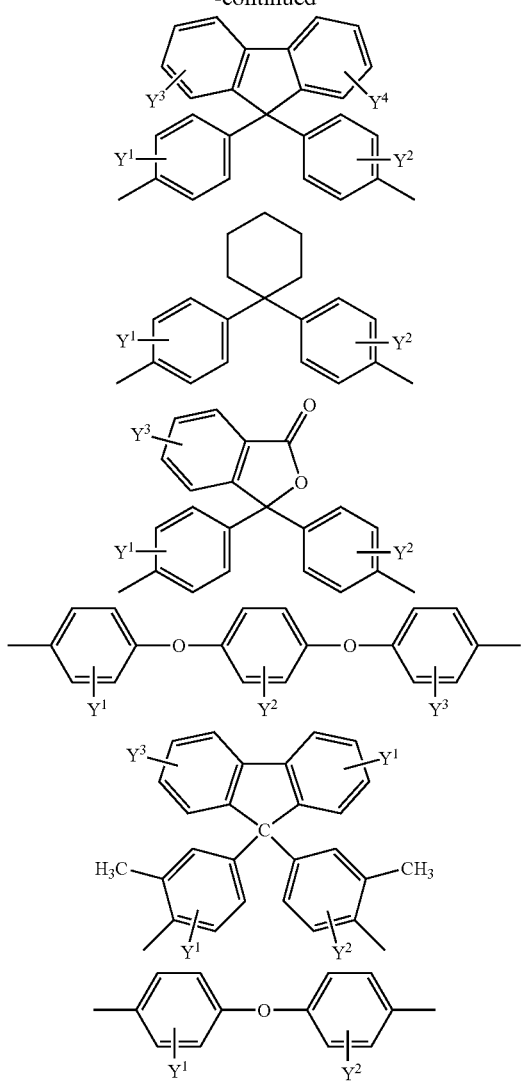

in the formula, $Y^1$ to $Y^4$ being the same or different and each representing a hydrogen group or a substituent; and the substituent representing a halogen atom, or an alkyl group, an alkoxy group, an alkylamino group, an alkylthio group, an aryl group, an aryloxy group, an arylamino group, or an arylthio group, which each may include a substituent.

More preferably, specific examples of the above-mentioned $R^1$ and $R^3$ include organic chains represented by the following structural formula group (6).

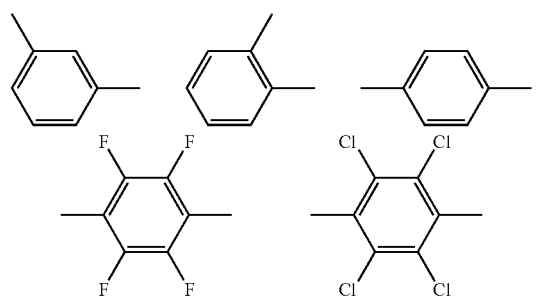

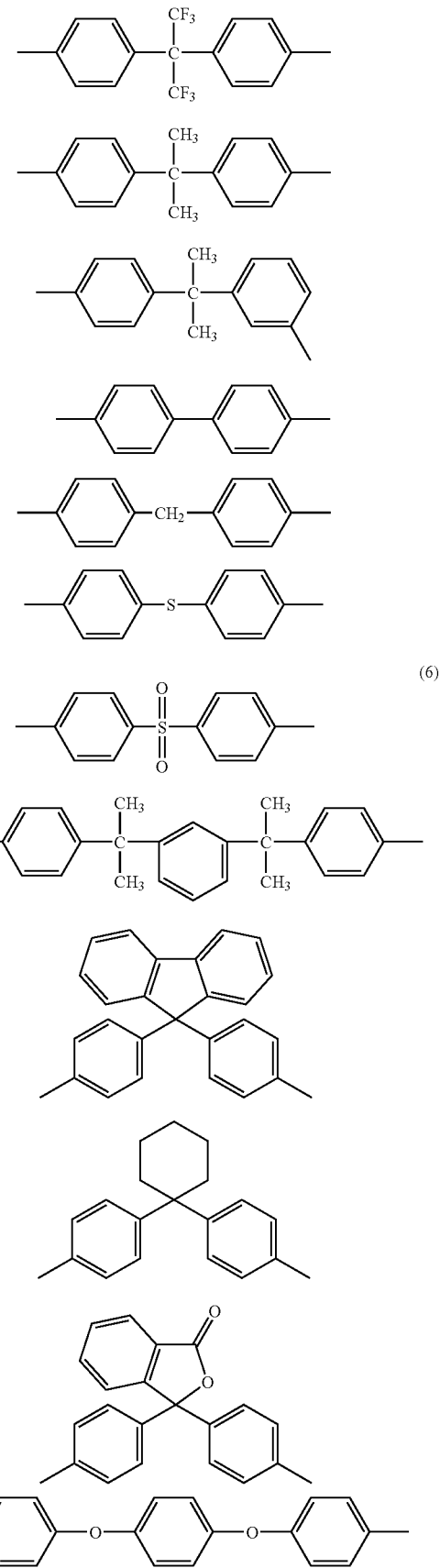

(6)

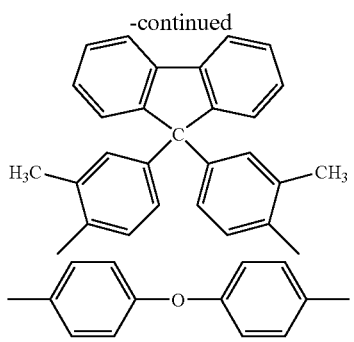

In the above formula (1-1), Z represents a divalent chain or a direct bond. Preferable examples of the divalent chain include chains represented by the following structural formula group (7) (structural formulae (7-1) to (7-13)).

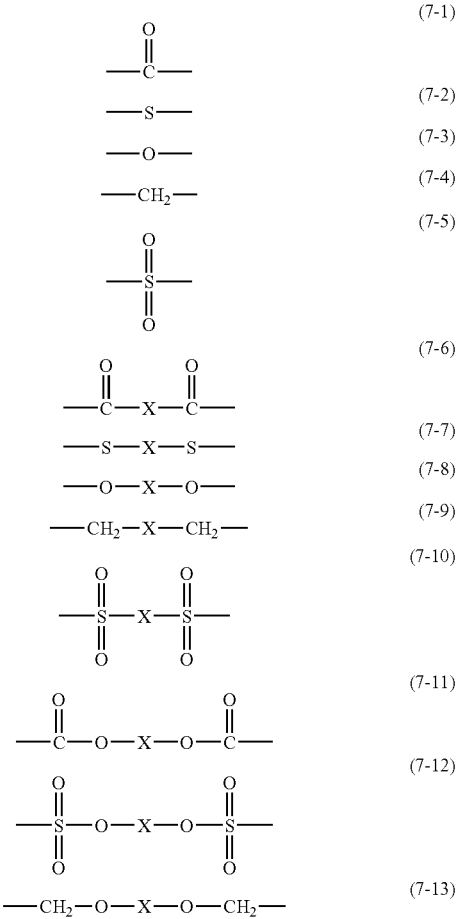

in the formula, X being a divalent organic chain containing 1 to 50 carbon atoms.

The organic chains represented by the structural formula group (6) may be mentioned as the above-mentioned X. Among these, a diphenyl ether chain, a bisphenol A chain, a bisphenol F chain, and a fluorene chain are preferable.

In the $R^2$ in the above-mentioned formula (1-2), preferable examples of the alkyl group include a methyl group, an ethyl group, a propyl group, an isopropyl group, a butyl group, an isobutyl group, a sec-butyl group, a tert-butyl group, a pentyl group, an isopentyl group, a neopentyl group, a hexyl group, a heptyl group, an octyl group, a nonyl group, a decyl group, an undecyl group, a dodecyl group, and a 2-ethylhexyl group.

Preferable examples of the above-mentioned alkoxy group include a methoxy group, an ethoxy group, a propoxy group, an isopropoxy group, a buthoxy group, a pentyloxy group, a hexyloxy group, a 2-ethylhexyloxy group, an octyloxy group, a nonyloxy group, a decyloxy group, an undecyloxy group, a dodecyloxy group, a furfuryloxy group, and an aryloxy group.

Preferable examples of the above-mentioned alkylamino group include a methylamino group, an ethylamino group, a dimethylamino group, a diethylamino group, a propylamino group, an n-butylamino group, a sec-butylamino group, and a tert-butylamino group.

Preferable examples of the above-mentioned alkylthio group include a methylthio group, an ethylthio group, a propylthio group, an n-butylthio group, a sec-butylthio group, a tert-butylthio group, and an iso-propylthio group.

Preferable examples of the above-mentioned aryl group include a phenyl group, a benzyl group, a phenetyl group, an o-, m-, or p-tolyl group, 2,3- or 2,4-xylyl group, a mesityl group, a naphthyl group, an anthryl group, a phenanthryl group, a biphenylyl group, a benzhydryl group, a trityl group, and a pyrenyl group.

Preferable examples of the above-mentioned aryloxy group include a phenoxy group, a benzyloxy group, a group derived from hydroxybenzoic acid and its ester (for example, methyl ester, ethyl ester, methoxy ethyl ester, ethoxyethyl ester, furfuryl ester, and phenyl ester), a naphthoxy group, an o-, m-, or p-methylphenoxy group, an o-, m-, or p-phenylphenoxy group, a phenylethnyl phenoxy group, and a group derived from cresotinic acid and its ester.

Preferable examples of the above-mentioned arylamino group include an anilino group, an o-, m-, or p-toluidino group, 1,2-, or 1,3-xylidino group, an o-, m-, or p-methoxyanilino group, and a group derived from anthranilic acid and its ester.

Preferable examples of the above-mentioned arylthio group include a phenylthio group, a phenylmethanethio group, an o-, m-, or p-tolylthio group, and a group derived from thiosalicylic acid and its ester.

Among these, an alkoxy group, an aryloxy group, an arylthio group, and an arylamino group, which each may include a substituent, are preferable as the above-mentioned $R^2$. $R^2$ may or may not contain a double or triple bond.

Preferable examples of the substituent in $R^2$ of the above-mentioned formula (1-2) include the above-mentioned $C_{1-12}$ alkyl groups; halogen atoms such as fluorine, chlorine, bromine, and iodine; and a cyano group, a nitro group, and a carboxy ester group. Hydrogen in these substituents may or may not be halogenated. Among these, a halogen atom, and a methyl group, an ethyl group, a propyl group, an isopropyl group, a butyl group, a pentyl group, a hexyl group, and a carboxy ester group, whose hydrogen may or may not be halogenated, are preferable.

(2) Polycyclic Aromatic Polymer

The above-mentioned polycyclic aromatic polymer is preferably a compound which includes, as a main skeleton, two or more bonded aromatic rings such as a naphthalene ring and a fluorene ring in a monomer unit.

According to the above-mentioned polycyclic aromatic polymer, the two or more aromatic rings are bonded through at least one bond selected from the group consisting of an ether bond, a ketone bond, a sulfone bond, an amide bond, an imide bond, and an ester bond. Specifically, it is preferable that the polycyclic aromatic polymer is polyester which includes naphthalenedicarboxylic acid as a main acid component and ethylene glycol as a glycol component (polyethylenenaphthalate). A homopolymer of polyethylene-2,6-naphthalenedicarboxylate is preferable as such polyethylene naphthalate. For example, part (less than 30% by mol) of a 2,6-naphthalenedicarboxylic acid component may be substituted with an isomer of 2,7-, 1,5-, 1,7-, or other naphthalene dicarboxylic acids, or, terephthalic acid, or other aromatic dicarboxylic acids such as isophthalic acid, diphenyldicarboxylic acid, diphenoxyethanedicarboxylic acid, diphenyletherdicarboxylic acid, and diphenylsulfonedicarboxylic acid; alicyclic dicarboxylic acids such as hexahydroterephthalic acid and hexahydroisophthalic acid; aliphatic dicarboxylic acids such as adipic acid, sebacic acid, and azelaic acid; or other difunctional carboxylic acids, for example, oxy acids such as p-β-benzoic acid and ∈-oxycaproic acid.

Further, a copolymer obtained by copolymerizing an ethylene glycol component, less than 30% by mole of which is substituted with one or more different polyfunctional compounds such as trimethylene glycol, tetramethylene glycol, hexamethylene glycol, decamethylene glycol, neopentyl glycol, diethylene glycol, 1,1-cyclohexane dimethanol, 1,4-cyclohexanedimethanol, 2,2-bis(4-β-hydroxyethoxyphenyl) propane, and bis(4'-β-hydroxyethoxyphenyl)sulfonic acid, may be mentioned.

(3) Polyimide Resin

The above-mentioned polyimide resin is not especially limited as long as it has transparency and it is a compound having an imide bond. A polyimide resin containing a repeating unit represented by the following formula (3):

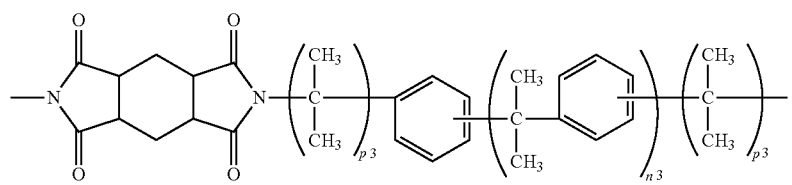

(3)

in the formula, $n^3$ being an integer of 0 to 4; $p^3$ being 0 or 1; and $n^3+p^3$ being an integer of 1 to 5.

(4) Fluorine-Containing Polymer Compound

It is preferable that the above-mentioned fluorine-containing polymer compound is a fluorine-containing polymer compound obtained using a monomer component which at least partly includes fluorine-containing alicyclic diamine or fluorine-containing aromatic diamine containing at least two cyclohexyl rings and two fluoroalkyl groups in the molecule. Specifically, preferable examples include:

a fluorine-containing polymer compound having a fluorine-containing alicyclic polyamide structure or a fluorine-containing aromatic polyamide structure having a repeating unit represented by the following formulae (8-1) to (8-4):

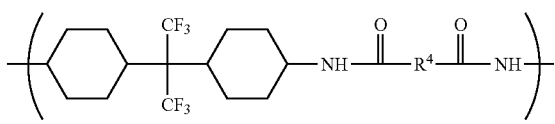
(8-1)

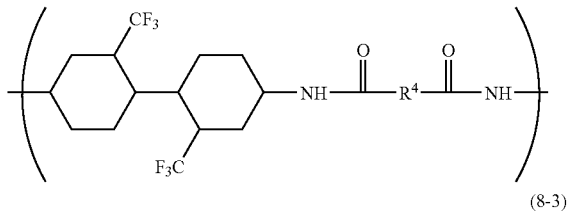
(8-2)
(8-3)

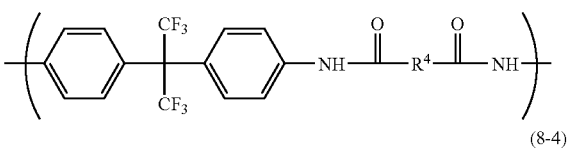
(8-4)

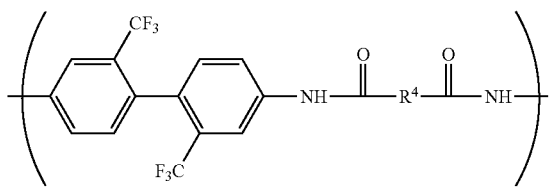

in the formula, $R^4$ representing one or more divalent groups selected from a straight chain, a branched structure, an alicyclic structure, an aromatic ring, a hetero ring, and optionally partly contains fluorine, oxygen, and/or nitrogen;

a fluorine-containing polymer compound which is fluorine-containing alicyclic polyamide acid, fluorine-containing aromatic polyamide acid, or an ester thereof, having a repeating unit represented by the following formulae (9-1) to (9-4):

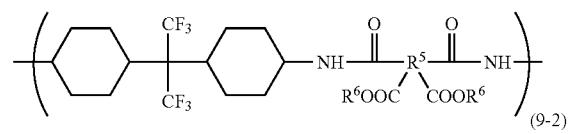
(9-1)
(9-2)

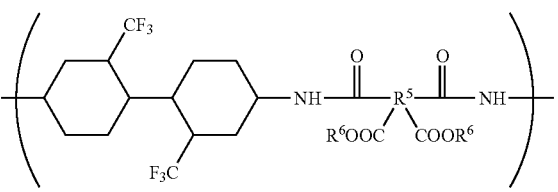
(9-3)

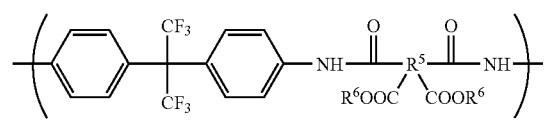

-continued (9-4)

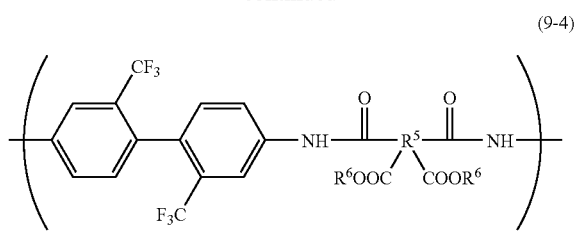

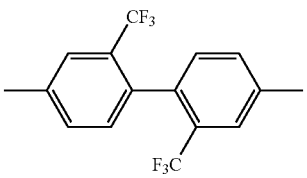

in the formula, $R^5$ being one or more different tetravalent groups selected from a straight chain, a branched structure, an alicyclic structure, an aromatic ring, a hetero ring, and optionally partly contains fluorine, oxygen, and/or nitrogen; $R^6$ being hydrogen, a $C_{1-20}$ straight or branched alkyl group, and optionally partly containing fluorine, oxygen, nitrogen, an unsaturated bond, and/or a cyclic structure; and a fluorine-containing polymer compound which is fluorine-containing alicyclic polyimide or fluorine-containing aromatic polyimide having a repeating unit represented by the following formulae (10-1) to (10-4):

(10-1)

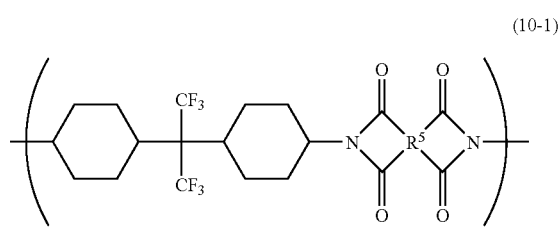

(10-2)

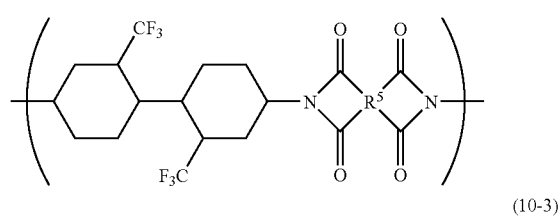

(10-3)

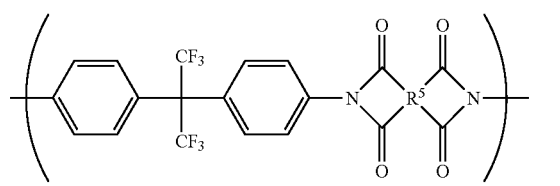

(10-4)

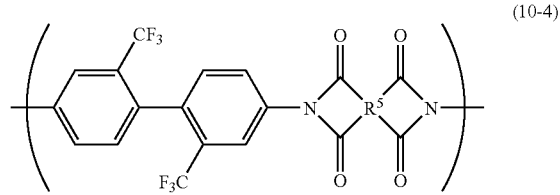

in the formula, $R^5$ being one or more different tetravalent groups selected from a straight chain, a branched structure, an alicyclic structure, an aromatic ring, a hetero ring, and optionally partly containing fluorine, oxygen, and/or nitrogen.

In the above-mentioned formula (10-3) or (10-4), an embodiment in which $R^5$ is represented by the following formula (11):

is preferable.

A fluorine-containing polymer compound containing tetrafluoroethylene is preferable as the fluorine-containing polymer compound. In view of transparency, particularly preferable are the above-mentioned tetrafluoroethylene/perfluoroalkylvinyl ether copolymers and PFA films such as NEOFLON™ film PFA with a thickness of 50 μm, product of DAIKIN INDUSTRIES, Ltd., and Naflon PFA sheet, T/#9000-PFA, product of NICHIAS Corp. (especially, NEOFLON™ film PFA with a thickness of 50 μm, product of DAIKIN INDUSTRIES, Ltd. is preferable).

(5) Epoxy Resin

A thermally curable epoxy resin composition and a photocurable epoxy resin composition are preferable as the above-mentioned epoxy resin. It is preferable that the epoxy resin contains a component with flexibility (flexible component) If the resin contains a flexible component, a resin composition which exhibits uniformity can be produced. With respect to the uniformity, for example, when molded or separated from a substrate, a mold, and the like, the resin composition is neither broken nor deformed, or it is easily separated or exhibits flexibility. Both of an embodiment (1) in which the flexible component includes a compound different from the organic resin component and an embodiment (2) in which one species of the organic resin component is a flexible component may be preferably applied to the above-mentioned flexible component.

Specifically, a compound having an oxyalkylene skeleton represented by $-[-(CH_2)_n-O-]_m-$ (n representing an integer of 2 or more, m representing an integer of 1 or more, and preferably, n representing an integer of 2 to 12, m representing an integer of 1 to 1000, and more preferably, n representing an integer of 3 to 6, and m representing an integer of 1 to 20) is preferable. Preferable examples of such a flexible component include YED-216D, YL-7217 (the oxyalkylene chain is oxybutylene, the epoxy equivalent amount: 437, a liquid epoxy resin (10° C. or more), each produced by Japan Epoxy Resins Co., Ltd.; high-molecular weight epoxy resin (for example, hydrogenated bisphenol (product of Japan Epoxy Resins Co., Ltd., YL-7170, the epoxy equivalent amount: 1000, a solid hydrogenated epoxy resin); an alicyclic solid epoxy resin (product of DAICEL INDUSTRIES, LTD., EHPE-3150); an alicyclic liquid epoxy resin (product of DAICEL INDUSTRIES, LTD., CELLOXIDE 2081); a liquid rubber such as liquid nitrile rubber, a polymer rubber such as polybutadiene, and a fine particle rubber having a particle diameter of 100 nm or less. Among these, a compound containing a curable functional group in the end side chain or the main chain skeleton. Thus, the preferable embodiments of the present invention include a resin composition in which the flexible component contains a curable functional group. The above-mentioned "curable functional group" means "a functional group which is cured by heat or light such as an epoxy group (glycidyl group) (a group which causes curing reaction of the resin composition)."

(6) Glass Film

It is preferable that the glass film has a thickness of 100 μm. Specifically, an embodiment in which the glass film includes silica as a main component may be mentioned. The proportion, kind, and the like of other components are not especially limited as long as 80% (at an irradiated light wavelength of 500 nm) of transparency is secured. D263, product of SCHOTT AG, is preferable as the glass film.

"Light Selective Transmission Layer"

The light selective transmission layer of the present invention is mentioned below.

An inorganic multilayer film which can control a refractive index of each wavelength, a transparent conductive film having a function of reflecting light at a desired wavelength, a dispersion film having a function of absorbing light at a desired wavelength, and the like are preferably used as the above-mentioned light selective transmission layer. A refractive index-controlling multilayer film which is obtained by alternately stacking a low refractive index material and a high refractive index material, by a vacuum deposition method, a sputtering method, and the like, on the base material or another functional material layer is preferable as the inorganic multilayer film. With respect to the transparent conductive film, a transparent conductive film which reflects infrared rays, such as indium-tin oxide (ITO), is preferable. A film obtained by dispersing nanoparticles of ITO and the like or an organic pigment into an inorganic or organic binder (base material), and the like, is preferable as an infrared-absorbent dispersion film.

A dielectric multilayer film obtained by alternately stacking a dielectric layer A and a dielectric layer B having a refractive index higher than a refractive index of the dielectric layer A is preferable as the above-mentioned inorganic multilayer film.

"Dielectric Layer A"

A material having a refractive index of 1.6 or less may be generally used as a material for the above-mentioned dielectric layer A. A material with a refractive index of 1.2 to 1.6 is preferably selected.

Preferable examples of the above-mentioned material include silica, alumina, lanthanum fluoride, magnesium fluoride, and sodium aluminum hexafluoride.

"Dielectric Layer B"

A material having a refractive index of 1.7 or more may be used as a material for the above-mentioned dielectric layer B. A material with a refractive index of 1.7 to 2.5 is preferably selected.

Preferable examples of the above-mentioned material include titanium oxide, zirconium oxide, tantalum pentoxide, niobium pentoxide, lanthanum oxide, yttrium oxide, zinc oxide, zinc sulfide, and a substance which includes indium oxide as a main component and a small amount of titanium oxide, tin oxide, cerium oxide, and the like.

"Stacking Method"

The method of stacking the above-mentioned dielectric layer A and the above-mentioned dielectric layer B is not especially limited as long as the dielectric multilayer film obtained by stacking these material layers is formed. For example, a dielectric multilayer film can be formed by alternately stacking the dielectric layer A and the dielectric layer B by a CVD method, a sputtering method, a vacuum (vapor) deposition method, and the like. The above-mentioned multilayer film can be preferably formed by the above-mentioned method and the like, but the following method may be used in order to reduce the possibility that the light selective transmission filter is deformed, curled, or cracked by the deposition.

Specifically, a deposited layer is formed on a temporary base material such as glass with which a demolding treatment is provided, and then the deposition layer is transferred to a real base material that is a base material of the light selective transmission filter, thereby forming the multilayer film. Such a transfer method is preferable. In this case, it is preferable that an adhesive layer is previously formed on the real base material that is a base material of the light selective transmission filter.

If the base material is an organic material, specifically, a resin composition, a method of depositing the above-mentioned dielectric layer and the like on a uncured or partially cured base material (resin composition), and then curing the base material is preferable. If such a method is employed, the base material becomes an almost liquid state because of an increase in fluidity when being cooled after the multilayer is deposited and therefore a problem due to a difference in thermal expansion coefficient between the resin composition and the dielectric layer and the like is not caused. As a result, the light selective transmission filter is suppressed from being deformed (curled).

Each of the above-mentioned dielectric layer A and the above-mentioned dielectric layer B generally has a thickness of $0.1\lambda$ to $0.5\lambda$ relative to the wavelength $\lambda$ (nm) of light to be shielded. If the thickness is out of the above-mentioned range, a product (n×d) of the refractive index (n) and the thickness (d) is largely different from the optical film thickness calculated based on $\lambda/4$ and an optical characteristic relationship between the reflection and the refraction is broken. Accordingly, it might be impossible to control the shielding or transmission of a specific wavelength.

The number of the stacked dielectric layers is generally within 10 to 80, and preferably 25 to 50 if the light selective transmission layer is the above-mentioned dielectric multilayer film formed on only one surface of the transparent base material. If the above-mentioned dielectric multilayer film is formed on both surfaces of the transparent base material, the whole number of the stacked dielectric layers on both surfaces is generally 10 to 80 and preferably 25 to 50.

The light selective transmission filter of the present invention selectively reduces a transmittance of light. It is preferable that such a light selective transmission filter exhibits a function of cutting light at a desired wavelength in accordance with the above-mentioned embodiment of the multilayer film. However, the light selective transmission filter may have another embodiment. For example, an infrared cut filter which reduces a transmittance of infrared rays preferably has an embodiment (1) in which a thin film composed of a metal oxide, which transmits visible rays and shields near-infrared rays is formed on the base material surface, an embodiment (2) in which a coating film having an infrared-absorbing function (for example, containing an infrared-absorbing pigment) is formed, or an embodiment (3) in which a material (raw material) having a function of cutting infrared rays is used for the base material. Such embodiments are also applied to the case where other wavelengths are selectively reduced. The use of such embodiments makes it possible to reduce or omit the stacking number of the multilayer film (multilayer deposition layers). As a result, the thickness of the light selective transmission filter can be reduced. According to the above-mentioned embodiment (1), the filter has a single layer structure and therefore has a small thickness. As a result, the optical path can be shortened and such a filter can be useful in an optical member such as a camera module. If an organic material, specifically, a resin composition is used as the base material, the base material can be suppressed from being curled when the multilayer film is formed and a reduction in costs is permitted.

If an inorganic material, specifically, glass is used as the base material, the base material can be suppressed from being cracked because the thickness of the multilayer deposition layers (multilayer film) is reduced.

According to the above-mentioned embodiment (1) in which a thin film composed of a metal oxide, which transmits visible rays and shields near-infrared rays is formed on the base material surface, a thin film having a function of reflecting and absorbing infrared rays, which is composed of indium oxide, tin oxide, zinc oxide, tungsten oxide, and the like, is preferable. Preferable is a method of forming, on the base material surface, a thin film composed of a metal oxide, which transmits visible rays and shields near-infrared rays, for example, an $In_2O_3$ oxide solid solution of 0.1 to 20 atomic % tetravalent metal element such as Sn and Ti or fluorine relative to indium; a $SnO_2$ oxide solid solution of 0.1 to 20 atomic % pentavalent metal element such as Sb and P or fluorine relative to tin; a ZnO oxide solid solution of 0.1 to 20 atomic % trivalent metal element such as B, Al, and In or a tetravalent metal element or fluorine relative to zinc; a tungsten oxide shown by $WO_3$; and a composite oxide including In and/or Zn as a metal component (In—Zn, In—Mg, In—Sn, Sn—Zn). It is preferable that such a thin film is formed by a sputtering method, a vacuum deposition method, and the like.

According to the above-mentioned embodiment (2) in which a coating film having an infrared-absorbing function is formed, a method of forming a coating film including ultra fine particles of the above-mentioned oxides, a coating film containing an infrared-absorbing pigment such as metal phthalocyanine, and the like, is preferable. It is preferable that such a coating film is formed by coating a coating material including the ultrafine particles or the infrared-absorbing pigment and as a binder, an organic or inorganic binder. According to the above-mentioned embodiment (3) in which a material (raw material) having a function of cutting infrared rays is used for the base material, if the base material is an organic material (for example, a resin composition), a method of mixing the above-mentioned oxide or pigment with a resin composition and molding the mixture into a film is preferable. If the base material is an inorganic material (for example, glass), an infrared-absorbing glass obtained using a solid solution of a metal element such as Fe is preferably used.

It is preferable that the light selective transmission filter of the present invention has various functions other than the function of selectively reducing a transmittance of desired light. It is preferable that an infrared cut filter in accordance with one preferable embodiment of the light selective transmission filter has embodiments in which the filter has various functions other than the function of cutting infrared rays, such as a function of shielding UV rays; and the filter has a function of improving physical properties such as toughness and strength of the infrared cut filter, for example.

According to the embodiment in which the above-mentioned infrared cut filter shields UV rays, it is preferable that the infrared cut filter is provided with a function of shielding UV rays by a method (a) of forming, on the base material surface, a thin film composed of a metal oxide such as titanium oxide, zinc oxide, and cerium oxide, which transmits visible rays and shields UV rays; a method (b) of forming a coating film including ultrafine particles of the above-mentioned oxides, a coating film containing an organic UV absorbent, and the like; or a method (c) of using a material (raw material) having a function of shielding UV rays.

The method of forming the thin film in the above-mentioned (a) and the method of forming the film in the above-mentioned (b) are preferably the same as the film formation methods in the above-mentioned (1) and (2), respectively. According to the method (c), a method of molding a resin composition, which is obtained by kneading the above-mentioned oxide or a pigment into a resin, into a film is preferable if the base material is an organic material (for example, resin composition). If the base material is an inorganic material (for example, glass), an infrared-absorbing glass obtained using a solid solution of a metal oxide such as Ag, Bi, Co, Fe, Ni, Ti, and Ce is preferably used.

A UV cut filter may be mentioned as the light selective transmission filter of the present invention. A thin film composed of a material having a UV absorbing function such as titanium oxide, zinc oxide, cerium oxide, and iron oxide is preferable according to the above-mentioned embodiment in which the UV cut filter has a function of shielding UV rays. Among them, an oxide solid solution prepared by dissolving 0.1 to 20 atomic % of at least one metal element selected from the group consisting of Cu, Ag, Mn, Bi, Co, Fe, and Ni into titanium oxide, zinc oxide, or cerium oxide is preferable.

A UV and infrared cut filter may be mentioned as the light selective transmission filter of the present invention. According to the above-mentioned embodiment in which the UV and infrared cut filter has a function of shielding UV rays and infrared rays, the above-mentioned dielectric layers (A) and (B)-stacked structure is preferable. An embodiment in which an oxide layer having an infrared cut function, composed of indium oxide, tin oxide, zinc oxide, tungsten oxide, and the like, and a layer excellent in UV cut function, composed of titanium oxide, zinc oxide, cerium oxide, iron oxide, and the like, are stacked is also preferably used.

"Preferable Configuration of Light Selective Transmission Filter"

The light selective transmission filter of the present invention is characterized in that the above-mentioned light selective transmission layer including the dielectric multilayer film is formed on at least one surface of the above-mentioned base material and on the other surface of the above-mentioned base material, another functional material layer is formed.

The light selective transmission filter of the present invention may have the above-mentioned light selective transmission layer including the dielectric multilayer film on both surfaces of the above-mentioned base material.

Because of such characteristics, warpage or crack of the dielectric multilayer film hardly occur in the light selective transmission filter according to the present invention.

"Film Formation Method"

The above-mentioned functional material layer can be formed on the above-mentioned base material by directly forming the functional material layer on the above-mentioned base material by the above-mentioned CVD method, a sputtering method, or a vacuum deposition method, or by attaching the functional material layer obtained by the above-mentioned method to the base material with an adhesive.

If the above-mentioned functional material layer is composed of a liquid composition containing a raw material substance, for example, the functional material layer can be obtained by directly coating this liquid composition on a transparent base material and then drying it.

If the above-mentioned functional material layer is formed on one surface of the transparent base material, one functional material layer may be formed, but two or more different functional material layers may be stacked. If the two or more different functional material layers are stacked, the above-mentioned film formation method may be used to stack them.

If the light selective transmission filter in accordance with the present invention is prepared by the above-mentioned method, warpage or crack of the dielectric multilayer film hardly occurs in the light selective transmission filter. If thus obtained light selective transmission filter is irradiated with laser light at a wavelength of 633 nm, the maximum number of Newton rings observed within a 60 mm diameter from the irradiation center of the laser light is generally 8 or less, and preferably 5 or less, which shows that such a light selective transmission filter is excellent in surface smoothness and uniformity. Accordingly, such a filter can be particularly preferably used for visibility control of a solid-state image sensing device.

"Application of Light Selective Transmission Filter"

Examples of the light selective transmission filter of the present invention include an infrared cut filter, a UV cut filter, a UV and infrared cut filter. The infrared cut filter according to the present invention has an excellent infrared cut ability and it is hard to crack. Accordingly, such an infrared cut filter is useful as a heat cut filter mounted on a glass in an automobile or building. Further, such a filter is particularly useful for visibility control of a solid-state image sensing device such as a CCD and a CMOS of a digital still camera, a camera for cellular phones, and the like. The UV cut filter according to the present invention has an excellent UV cut ability and it is hard to crack. Accordingly, such a UV cut filter is useful as a UV protective filter or useful for visibility control. The UV and infrared cut filter according to the present invention has an excellent infrared and UV cut ability and it is hard to crack. Therefore, such a UV and infrared cut filter is useful as a filter for shielding optical noise in an imaging lens.

Effect of the Invention

The light selective transmission filter of the present invention has the above-mentioned configuration. The filter selectively shields light and has a high transmittance of light at a specific wavelength such as visible rays, and has a sufficiently reduced thickness and excellent heat resistance. Therefore, such a filter can be preferably used in various applications such as an opto device application, a display device application, a mechanical component, and an electrical or electronic component.

EXPLANATION OF NUMERALS AND SYMBOLS

Figure 1:
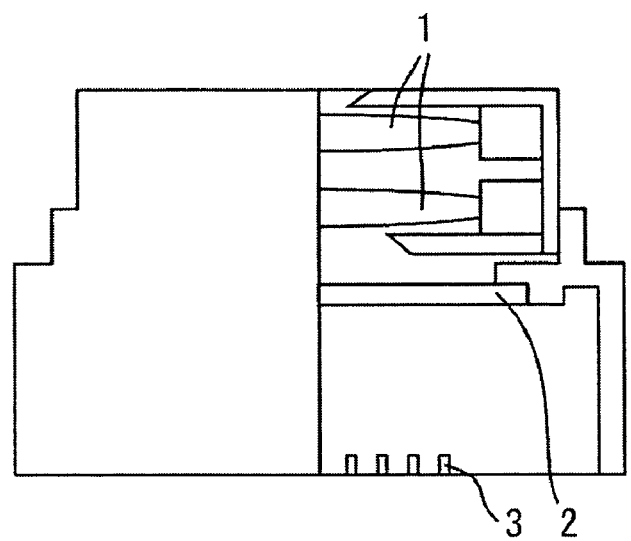
FIG. 1 is a cross-sectional view schematically showing a configuration of a camera module.
Figure 2:
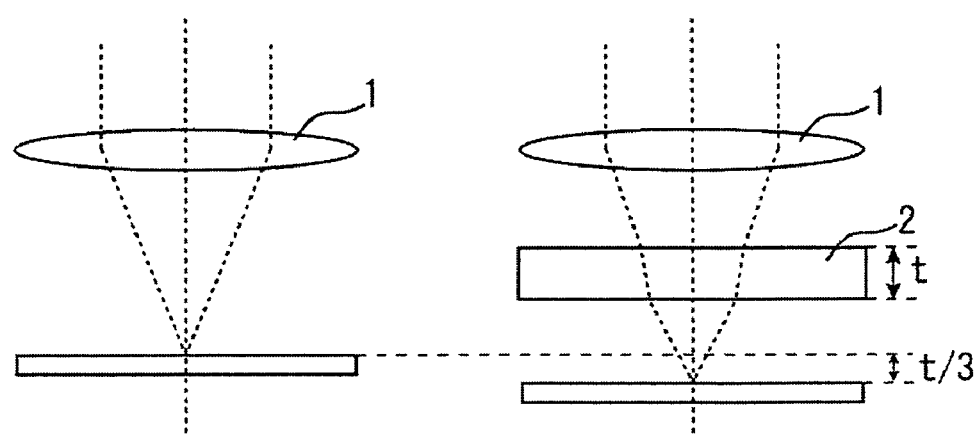
FIG. 2 is a schematic view showing extension of a back focus depending on existence of a light selective transmission filter.

1: Lens
2: Light selective transmission filter
3: Sensor lens
4a, 4b, 4c: Light selective transmission layer formation part
5a, 5b, 5c: Light selective transmission layer non-formation part
6c: Hole

DESCRIPTION OF THE PREFERRED EMBODIMENTS

The present invention is described in more detail below with reference to Examples, but the present invention is not limited to only the following Examples. The terms "part(s)" and "%" represent "part(s) by weight" and "% by weight", respectively, unless otherwise specified.

1. Base Material
(1) Preparation of FPEK Film
"Production of FPEK"

Into a reactor equipped with a thermometer, a cooling tube, a gas inlet tube, and a stirrer, BPDE (4,4'-bis(2,3,4,5,6-pentafluorobenzoyl)diphenylether) 16.74 parts, HF(9,9-bis(4-hydroxyphenyl)fluorene) 10.5 parts, potassium carbonate 4.34 parts, DMAc (dimethyacetamide) 90 parts were charged. This mixture was heated to 80° C. and the reaction was allowed to proceed for 8 hours. After completion of the reaction, the reaction solution was added into a 1% aqueous solution of acetic acid under agitation with a blender. The deposited reactant was separated from the solution through filtration and washed with distilled water and methanol. Then, the reactant was dried under reduced pressure. As a result, a fluorinated aromatic polymer was obtained. The reaction formula is shown below. The fluorinated aromatic polymer is a fluorinated aromatic polymer having a repeating unit repeating unit obtained by a reaction represented by the following reaction formula.

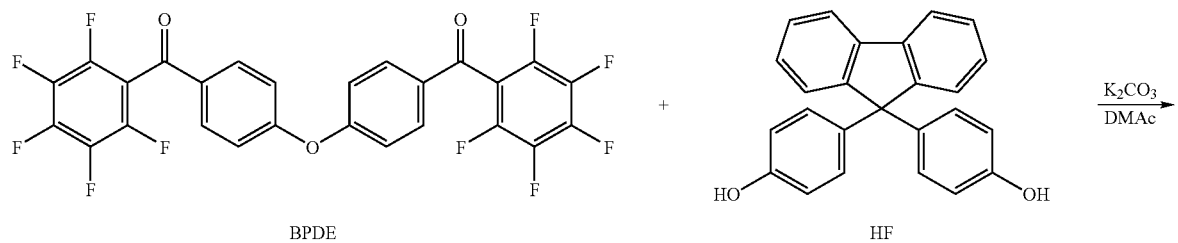

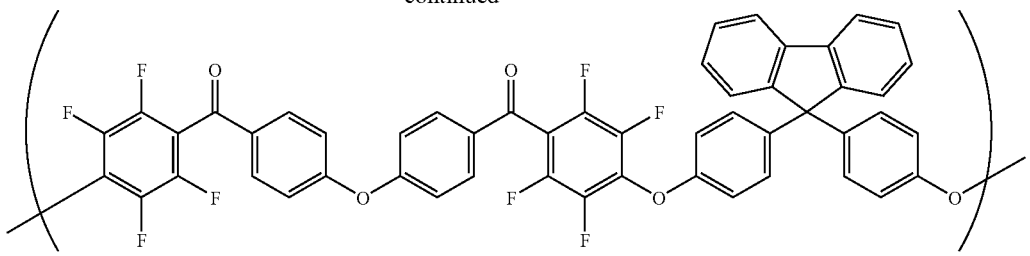

With respect to the above-mentioned polymer, the glass transition temperature (Tg) was 242° C., the number average molecular weight (Mn) was 70770, and the surface resistance was $1.0 \times 10^{18}$ Ω/cm² or more.

"Formation of Base Material"

A film with 50 μm (hereinafter, referred to as FPEK film) was obtained by a solvent cast method. In the solvent cast method, a mixed solvent of ethyl acetate and toluene was used as a solvent to form the film.

(2) Polyethylene Naphthalate Film (PEN Film)

(2-1) Teonex Q 83 having a thickness of 25 μm and a melting point of 269° C., product of Teijin Dupont Films Ltd., was used as the PEN film.

(2-2) Teonex Q83 having a thickness of 75 μm and a melting point of 269° C., product of Teijin Dupont Films Ltd., was used as the PEN film.

(3) Polyimide Film (3-1) Neopulim L-3430 having a thickness of 50 μm, product of MITSUBISHI GAS CHEMICAL COMPANY, INC., was used.

(3-2) Neoprim L-3430 having a thickness of 100 μm, product of MITSUBISHI GAS CHEMICAL COMPANY, INC., was used.

(4) Fluorine-Containing Polymer Compound Film (4-1) Preparation of Fluorinated Polyimide Film "Production of Polyamide Acid Solution"

Into a 50 ml three-neck flask, 2,2'-bis(trifluoromethyl)-4, 4'-diaminobiphenyl 4.18 g (13.1 mmole) (abbreviated name: TFBD), 4,4'-hexafluoropropylidene bisphthalic acid dianhydride 5.81 g (13.1 mmole) (abbreviated name: 6FPA), and N,N-dimethyl acetamide 40 g were charged. This mixed solution was stirred at a room temperature for 2 days in nitrogen atmosphere. As a result, a polyamide acid solution was obtained.

"Formation of Base Material"

The above-mentioned polyamide acid solution was coated on a silicon substrate having a diameter of 4 inches and a thickness of 525 μm by a spin coat method for 60 seconds at 300 rpm. Then, the solvent was heated at 70° C. for 2 hours and at 300° C. for 1 hour in nitrogen atmosphere. After cooled, the film was separated from the substrate to obtain a fluorinated polyimide film (referred to as a F-PI film) with a thickness of about 50 μm.

(4-2) PFA Film

NEOFLON™ film PFA having a thickness of 50 μm, product of DAIKIN INDUSTRIES, Ltd., was used.

(5) Epoxy Resin

Diglycidyl ether of polytetramethylene ether glycol (trade name: EPICOAT YL 7217, product of Japan Epoxy resins Co., Ltd.) 19 parts, bisphenol A epoxy resin (trade name: EPICOAT 828EL, product of Japan Epoxy Resins Co., Ltd.) 55 parts, hydrogenated bisphenol A epoxy resin (trade name: EPICOAT YX 8000, product of Japan Epoxy Resins Co., Ltd.) 22 parts, hexafluorophosphate aryl sulfonium salt (trade name: UVI-6992, product of The Dow Chemical Company) 4 parts were mixed with a revolving/rotating centrifugal mixer (product name: Awatori Rentaro (registered trademark, product of THINKY Co., Ltd.).

"Formation of Base Material"

A film of the above-mentioned epoxy resin composition was formed to have a thickness of 50 μm by a cast method. Then, the film was irradiated with 10 mW/cm² for 15 minutes using an exposure device including a high-pressure mercury lamp as a light source (product name: MA-60F, product of MIKASA CO., LTD.), that is, irradiated with UV rays at an exposure energy of 9 J/cm².

(6) Glass Film

Glass code: D263, product of SCHOTT AG, having a thickness of 30 μm, was used.

(7) Preparation of Glass/FPEK Film (7-1) Glass/FPEK Film

Fluorinated polyether ketone (FPEK) 1.57 g was added to propyleneglycol monomethyl ether acetate 10.45 g and the mixture was homogeneously stirred. Using a spin coat method, the mixture was coated on a glass film (30 μm) to have a thickness of 5 μm and dried at 150° C.

(7-2) FPEK/Glass/FPEK Film

When the FPEK was coated on both surfaces of the glass, the FPEK was coated on one surface of the glass as in (7-1), and then further coated on the other glass surface in the same manner as in (7-1).

(8) Preparation of Glass/Fluorene Epoxy and FPEK Film (8-1) Glass/Fluorene Epoxy and FPEK Film FPEK 1.0 g and fluorene epoxy (product of Osaka Gas Chemical Co., Ltd.), ONCOAT EX-1020, 0.5 g were added to propylene glycol monomethyl ether acetate 10 g and the mixture was homogeneously stirred.

Then, a cationic initiator (product of SANSHIN CHEMICAL INDUSTRY CO., LTD., SAN-AID SI-60L) 0.016 g (solid content: 32%) was homogeneously stirred at 40° C. or less.

A film of the mixture was formed in the same spin coat operation as in the above-mentioned (7-1).

(8-2) Fluorene Epoxy and FPEK/Glass/Fluorene Epoxy and FPEK Film

If the fluorene epoxy and FPEK were coated on both surfaces of the glass, the fluorene epoxy and FPEK were coated on one glass surface as in (8-1), and then further coated on the other glass surface in the same manner as in (8-1).

(9) PET T60 Film

Lumirror, type: T60 (referred to as PET T60 film), product of TORAY INDUSTRIES, INC., was used.

(10) ARTON Film

ARTON F having a thickness of 190 μm, product of JSR Corp., was used.

2. Evaluation for Physical Properties of Base Materials

Each of the above-mentioned base materials (1) to (10) was measured for a refractive index, an Abbe number, a transmittance (%) of irradiation light at a wavelength of 500 nm, and evaluated for heat resistance at 260° C. and subjected to a bending test. Table 1 shows the results.

In every base material, the transmittance of light at 500 nm was 80% or more and the transparency was excellent. In the bending test, each of the (7-1) to (8-2) films including the stacked organic materials has an improved bending resistance angle of less than 10 mm although the (6) glass film cracked when R was 10 mm. Therefore, it was shown that the glass films (7-1) to (8-2) were provided with flexibility. In the evaluation for heat resistance at 260° C., the (9) PET film and the (10) ARTON film were melt down, but other base materials composed of the functional films with reflow resistance showed high heat resistance.

Each of the above-mentioned base materials (1) to (10) was measured for a refractive index, an Abbe number, a transmittance (%) of irradiation light at a wavelength of 500 nm, and evaluated for heat resistance at 260° C. and subjected to a bending test.

3, each of the base materials (1) to (10) was wrapped around a plastic conical mold. Then, a diameter (R) of the mold when the base material cracked was measured. The base material had a width of 10 mm. The thickness of the base material was as mentioned above. Only in a semicircle region, the base material got in touch with the conical mold.

The diameter R of the mold was reduced at 0.2 mm/s from 30 mm. The test was performed at 25° C. Each of the base materials (7-1) and (8-1) was wrapped around the mold in such a way that the glass was positioned on the mold side, that is, the glass surface was wrapped around the conical mold. In such a manner, the evaluation was performed to determine the diameter. Table 1 shows the results. According to the bending test, the (6) glass film cracked when the diameter R was 10 mm, which shows that the (6) glass film is easily broken and therefore insufficient in handleability in measurement, transport, washing, and processing steps. The (1), (5), (9), and (10) films cracked when the diameter R was less than 1 mm, which shows that the films were excellent in flexibility and advantageous for handleability.

TABLE 1

| | Physical properties of base material | | | | | | | | |
|---|---|---|---|---|---|---|---|---|---|
| Base material | Refractive index (486 nm) | Refractive index (589 nm) | Refractive index (656 nm) | Abbe number | Thickness of film (μm) | 500 nm transmittance (%) | Evaluation for heat resistance at 260° C. | R (mm) | Handleability |
| (1) FPEK film | 1.6493 | 1.6265 | 1.6474 | 19.6 | 50 | 86.9 | No change | <1 | Good |
| (2-1) PEN film | — | — | — | — | 25 | 76.1 | Slightly curled, but not so melted | <1 | Good |
| (2-2) PEN film | — | — | — | — | 75 | 75.2 | No change | <1 | Good |
| (3-1) Polyimide film | 1.6223 | 1.6088 | 1.6014 | 29.0 | 50 | 88.1 | No change | <1 | Good |
| (3-2) Polyimide film | 1.6223 | 1.6088 | 1.6014 | 29.0 | 100 | 87.8 | No change | <1 | Good |
| (4-1) F-PI film | 1.5744 | 1.5558 | 1.5491 | 22.0 | 50 | 89.8 | No change | <1 | Good |
| (4-2) PFA film | — | — | — | — | 50 | 92.8 | No change | <1 | Good |
| (5) Epoxy film | — | — | — | — | 50 | 88.3 | No change | <1 | Good |
| (6) Glass film | 1.5288 | 1.5221 | 1.5191 | 53.8 | 30 | 91.3 | No change | 10 | Brittle Easily crack |
| (7-1) Glass/FPEK film | — | — | — | — | 35 | 90.3 | No change | 8.5 | — |
| (7-2) FPEK/Glass/FPEK film | — | — | — | — | 40 | 90.1 | No change | 8 | — |
| (8-1) Glass/Fluorene epoxy. FPEK film | — | — | — | — | 35 | 90.2 | No change | 8 | — |
| (8-2) Fluorene epoxy.FPEK/ Glass/Fluorene epoxy.FPEK film | — | — | — | — | 40 | 89.8 | No change | 8 | — |
| (9) PET T60 | 1.6918 | 1.6716 | 1.6638 | 24.0 | 100 | 88.9 | Completely melted down | <1 | Good |
| (10) ARTON | — | — | — | — | 190 | 92.8 | Completely melted down | <1 | Good |

"Refractive Index Measurement and Abbe Number Measurement"

The measurement was performed at 20° C. using DR-M2 (product of ATAGO CO., LTD.).

"Transmittance Measurement"

The transmittance at 500 nm was measured using Shimazu UV-3100 (product of Shimazu Corp.). Table 2 shows the thickness.

"Evaluation of Heat Resistance at 260° C."

The above-mentioned base materials (1) to (10) were evaluated for heat resistance by the following method. The base material was cut in 2 cm×1 cm. The upper end (the 1 cm side) of the film was fixed and then heated in an oven at 260° C. for 3 minutes.

The state of the base material after heating was shown in Table 1. The state of the base material was determined by observing the change in the base material after the heat resistance evaluation test at 260° C. with eyes.

"Bending Test"

The above-mentioned base materials (1) to (10) were evaluated for a strength by the bending test. As shown in FIG.

3. Preparation of Light Selective Transmission Filter

"Formation of Light Selective Transmission Layer"

On both surfaces of the base material 60 mm on a side, a multilayer film reflecting infrared rays was formed by alternately stacking a silica layer ($SiO_2$) having a thickness of 120 to 190 nm and a titania layer ($TiO_2$) having a thickness of 70 to 120 nm by vapor deposition at 180° C. On each surface of the base material, 25 layers were deposited and the total number of the stacked layers was 50. As a result, a light selective transmission filter (optical filter) was produced.

4. Evaluation of Light Selective Transmission Filter

"Transmittance Measurement"

This optical filter was measured for a spectral transmittance curve. The result in the case where FPEK was used as the base material was shown in FIG. 4.

Figure 4:
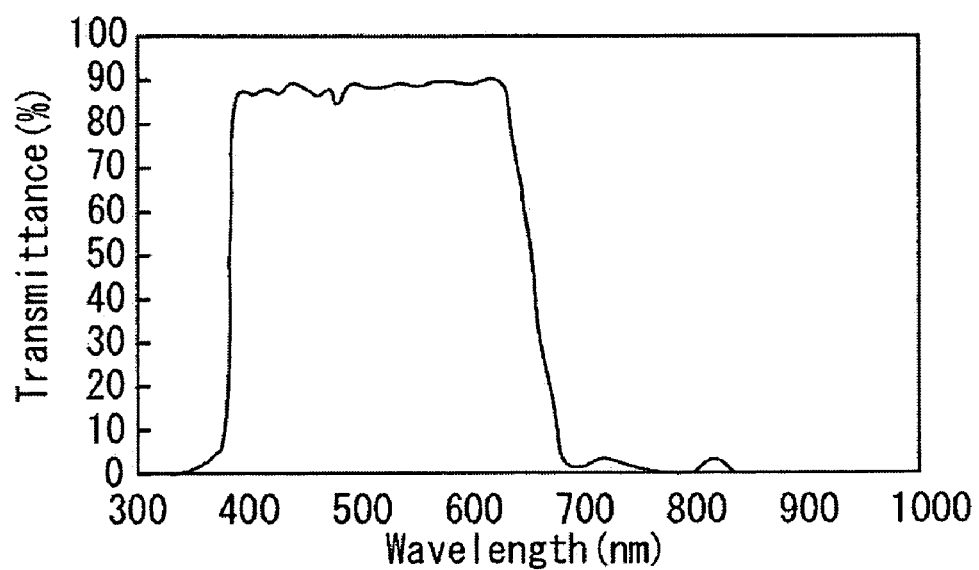
FIG. 4 is a view schematically showing the spectral transmittance curve of the light selective transmission filter.

In the graph of FIG. 4, the horizontal axis shows a wavelength and the vertical axis shows a transmittance. As clearly shown in this graph, the transmittance in the visible range at a wavelength of 400 to 600 nm was about 85% or more and the transmittance in the near-infrared range at a wavelength of 750 to 1000 nm was 5% or less. The optical filter shows excellent performances as a light selective transmission filter.
"Spectral Transmittance Measurement"

The light selective transmission filter was measured for a transmittance at 300 to 1000 nm using Shimadzu UV-3100 (product of Shimazu Corp.).

Light selective transmission filters were obtained by forming the light selective transmission layer also on the above-mentioned base materials (2) to (8-2). Each of these light selective transmission filters was measured for transmittances at 400 to 600 nm and 750 to 1000 nm. Table 2 shows the results.

path length and reducing an optical member as long as the filters have a thickness of less than 200 μm and selectively reduces a transmittance of light. Accordingly, it can be sure that such light selective transmission filters can exhibit the advantageous effects of the present invention as long as they selectively reduce a transmittance of infrared rays and have a thickness of less than 200 μm. At least if a light selective transmission filter is produced using a base material including at least one selected from the group consisting of a fluorinated aromatic polymer, a polycyclic aromatic polymer, a polyimide resin, a fluorine-containing polymer compound, an epoxy resin, and a glass film, the above-mentioned Examples and Comparative Examples sufficiently verify the advantageous

TABLE 2

| Base material | Thickness of light selective transmission filter(μm) | Evaluation for heat resistance at 260° C. | R (mm) | Transmittance of light selective transmission filter(%) 400~600 nm | 750~1000 nm |
|---|---|---|---|---|---|
| (1) FPEK film | 55 | No change | <1 | 85 or more | 5 or less |
| (2-1) PEN film | 29 | Wrinkled but not melted | <1 | 75 or more | 5 or less |
| (2-2) PEN film | 80 | No change | <1 | 75 or more | 5 or less |
| (3-1) Polyimide film | 55 | No change | <1 | 85 or more | 5 or less |
| (3-2) Polyimide film | 104 | No change | <1 | 85 or more | 5 or less |
| (4-1) F-PI film | 55 | No change | <1 | 85 or more | 5 or less |
| (4-2) PFA film | 55 | Wrinkled but not melted | <1 | 85 or more | 5 or less |
| (5) Epoxy film | 56 | No change | 3 | 90 or more | 5 or less |
| (6) Glass film | 35 | No change | 15 | 90 or more | 5 or less |
| (7-1) Glass/FPEK film | 40 | No change | 11 | 90 or more | 5 or less |
| (7-2) FPEK/Glass/FPEK film | 45 | No change | 10 | 90 or more | 5 or less |
| (8-1) Glass/Fluorene epoxy.FPEK film | 40 | No change | 13 | 90 or more | 5 or less |
| (8-2) Fluorene epoxy.FPEK/Glass/Fluorene epoxy.FPEK film | 45 | No change | 11 | 90 or more | 5 or less |
| (10) ARTON | 195 | Completely melted down | <1 | 85 or more | 5 or less |

"Evaluation for Heat Resistance at 260° C."

The light selective transmission filters prepared using the above-mentioned base materials (1) to (8-2) and (10) were evaluated for heat resistance by the following method.

The base material was cut in 2 cm×1 cm. The upper end (the 1 cm side) of the film was fixed and then heated in an oven at 260° C. for 3 minutes.

Table 2 shows the state of the light selective transmission filter after heated.
"Bending Test"

Figure 3:
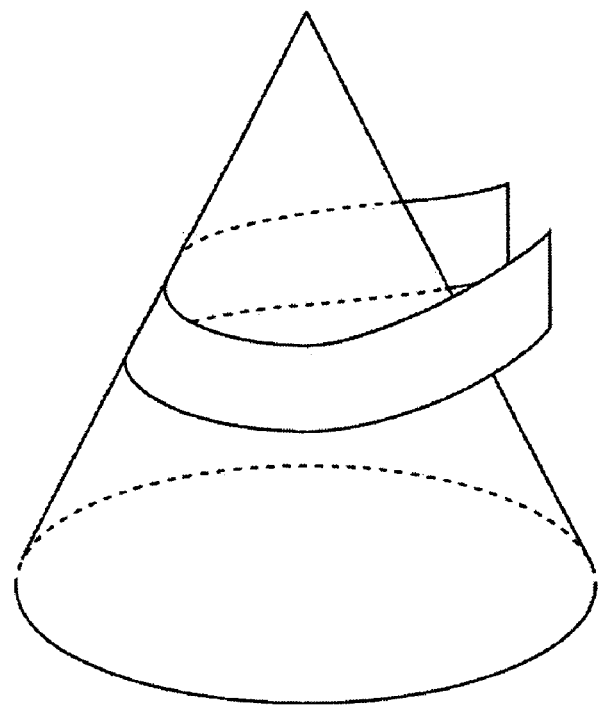
FIG. 3 is a view schematically showing the bending test of the base material, in accordance with the present invention.

The above-mentioned base materials (1) to (8-2) and (10) were evaluated for a strength by the bending test. As shown in FIG. 3, each of the base materials (1) to (8-2) and (10) was wrapped around a plastic conical mold. Then, a diameter (R) of the mold when the base material cracked was measured. The light selective transmission filter had a width of 10 mm. Only in a semicircle region, the light selective transmission filter got in touch with the conical mold.

The diameter R of the mold was reduced at 0.2 mm/s from 30 mm. The test was performed at 25° C.

Table 2 shows the thickness of the light selective transmission filter and the results of the bending test.

In the above-mentioned Examples and Comparative Examples, at least one selected from the group consisting of the FPEK film, the PEN film, the polyimide film, the fluorinated polyimide film, the PFA film, the epoxy resin, and the glass film was used as the base material of the light selective transmission filters. However, such light selective transmission filters have the same mechanism of shortening an optical effects of the present invention and support the technical meaning of the present invention.
"Examination of Conditions for Forming Light Selective Transmission Layer"

Figure 5:
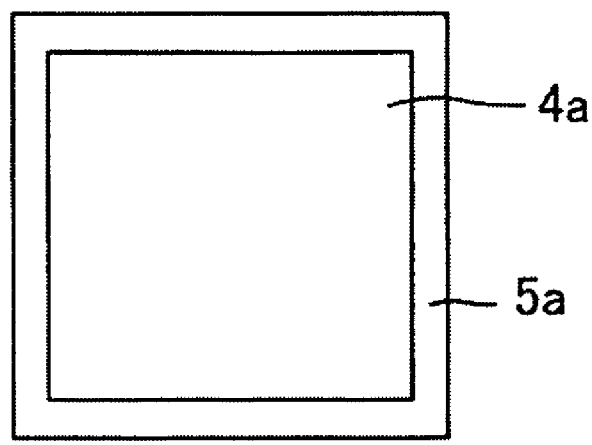
FIG. 5 is a planar view schematically showing an arrangement relationship between the base material film and the tape for vapor deposition, attached in the edge of the base material film.

The conditions for depositing the light selective transmission layer were also examined. The above-mentioned base materials (1) to (5) were used as a base material film. FIG. 5 is a planar view schematically showing a vapor deposition part (formation part) and a non vapor deposition part (non-formation part) of the light selective transmission layer. As shown in FIG. 5, a tape for vapor deposition was attached to the surrounding (edge) of the base material film. As a result, the light selective transmission layer was deposited only in the center of the base material film. The base material film was a square 60 mm on a side. The sealed edge had a width of 5 mm. Table 3 shows the conditions for depositing the light selective transmission layer and the obtained light selective transmission filter.

Table 3

The above-mentioned light selective transmission layer was a multilayer film formed by alternately stacking a silica ($SiO_2$) layer and a titania ($TiO_2$) layer. The total number of the stacked layers was 50. The 50 layers were stacked on only one surface or 25 layers were stacked on each surface by vapor deposition. The thickness of the light selective transmission layer was 3 to 7 μm.

First, results obtained by comparing the case where the light selective transmission layer was formed on only one surface of the base material film with the case where the light selective transmission layer was formed on both surfaces of the base material film are mentioned. The temperature at which the light selective transmission layer was deposited was 180° C. or 80° C. As shown in Table 3, if the light selective transmission layer was formed on only one surface of the base material film, every base material was curled. However, if the light selective transmission layer was deposited on both surfaces of the base material film, each of the base materials (1) to (5) was suppressed from being curled at vapor deposition temperatures of 180° C. and 80° C. This would be because the stress on the both surfaces, generated due to a difference in a thermal expansion rate between the base material film and the light selective transmission layer, was uniformed by the vapor deposition on the both surfaces.

Then, the results obtained by depositing the light selective transmission layer on both surfaces of each base material film by changing the temperature at which the light selective transmission layer is deposited are mentioned. The vapor deposition temperatures were 180° C., 120° C., 100° C., 90° C., 80° C., and 65° C. In the cases where the light selective transmission layer was deposited at 180° C. or 120° C., the light selective transmission filters could be prepared without being curled. Further, if the light selective transmission layer was deposited at 180° C. or 120° C., a non-smooth surface of the base material film was observed. However, if the light selective transmission layer was deposited at 100° C., 90° C., 80° C., or 65° C., neither curling nor non-smoothing was observed. Therefore, the entire surface of each light selective transmission filter could be flat and smooth. That is, if the light selective transmission layer is formed on both surfaces of each base material film, it is preferable that the layer is deposited at less than 120° C. The vapor deposition temperature is more preferably 100° C. or less.

Figure 6:
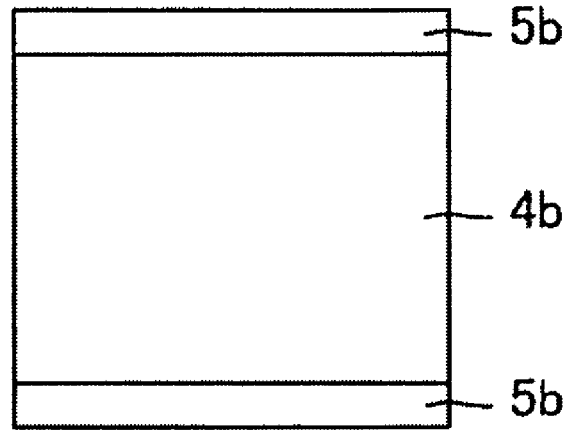
FIG. 6 is a planar view schematically showing an arrangement relationship between the base material film and the tape for vapor deposition, attached only in the upper and lower edges of the base material film.
Figure 7:
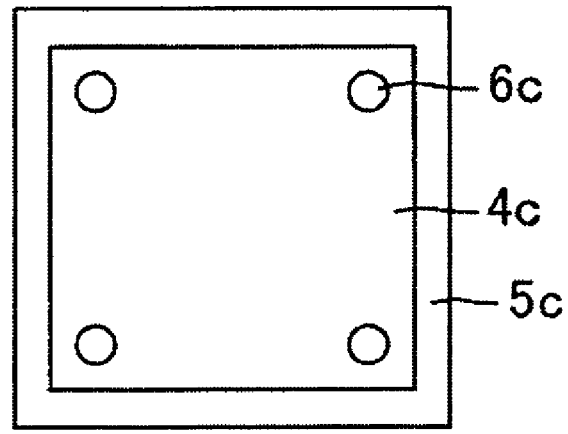
FIG. 7 is a planar view schematically showing an arrangement relationship among the base material film, the tape for vapor deposition, and the hole.

Then, the light selective transmission layer was deposited to each of the base material films (1) to (5). The shape of the vapor deposition part was varied. The shape of the vapor deposition part was varied by changing an arrangement of a tape for vapor deposition, attached to the base material film before the light selective transmission layer was formed. FIGS. 5, 6, and 7 show the shape of the formation part and the non-formation part of the light selective transmission layer. In FIG. 3, as mentioned above, the tape for vapor deposition was attached to an edge 5*a* of the base material film that was a square 60 mm on a side to form a light selective transmission layer non-formation part 5*a*. Then, the light selective transmission layer was deposited only in the center 4*a* of the base material film. The edge had a width of 5 mm. In FIG. 6, the tape for vapor deposition was attached on only the upper and lower sides (when the base material film was viewed in plane) of the base material film to form a light selective transmission layer non-formation part (edge) 5*b*. Then, the light selective transmission layer was deposited up to the right and left ends (when the base material film was viewed in plane). As a result, a light selective transmission layer formation part 4*b* was formed. In FIG. 7, as in the shape (1) shown in FIG. 5, the tape for vapor deposition was attached to the surrounding of the film to form a light selective transmission layer non-formation part (edge) 5*c*. Further, a hole 6*c* for fixing a sample was previously formed in a light selective transmission layer formation part 4*c* for which the vapor deposition would be performed. Then, the light selective transmission layer was deposited. The embodiments shown in FIGS. 5, 6, and 7 are referred to as the first arrangement embodiment, the second arrangement embodiment, and the third arrangement embodiment, respectively. The light selective transmission layer was deposited on both surfaces of each base material film. Table 4 shows the arrangement embodiment of the attached tape for vapor deposition, the vapor deposition conditions, and the obtained light selective transmission filters.

TABLE 4

| Base material | Deposition surface | Arrangement embodiment | Deposition temperature | | | | |
|---|---|---|---|---|---|---|---|
| | | | 120° C. | 100° C. | 90° C. | 80° C. | 65° C. |
| (1) FPEK film | Both surfaces | The first embodiment | No separated | No separated | No separated | No separated | No separated |
| (1) FPEK film | Both surfaces | The second embodiment | — | — | — | — | Separated at the right and left edges |
| (1) FPEK film | Both surfaces | The third embodiment | Separated around hole | Separated around hole | — | — | — |
| (2-2) PEN film | Both surfaces | The first embodiment | No separated | No separated | No separated | No separated | No separated |
| (2-2) PEN film | Both surfaces | The second embodiment | — | — | — | — | No separated |
| (2-2) PEN film | Both surfaces | The third embodiment | No separated | No separated | — | — | — |
| (3-1) Polyimide film | Both surfaces | The first embodiment | No separated | No separated | No separated | No separated | No separated |
| (3-1) Polyimide film | Both surfaces | The second embodiment | — | — | — | — | Separated at the right and left edges |
| (3-1) Polyimide film | Both surfaces | The third embodiment | Separated around hole | Separated around hole | — | — | — |
| (5) Epoxy film | Both surfaces | The first embodiment | No separated | No separated | No separated | No separated | No separated |
| (5) Epoxy film | Both surfaces | The second embodiment | — | — | — | — | Separated at the right and left edges |
| (5) Epoxy film | Both surfaces | The third embodiment | Separated around hole | Separated around hole | — | — | — |

In the base materials (1) to (5) in accordance with the first arrangement embodiment, no separation of the light selective transmission layer was observed at each vapor deposition condition of 65 to 120° C. In the base materials (1), (3), (4), and (5) in accordance with the second arrangement, separation of the light selective transmission layer was observed in the right and left ends (the edge non-formation part). In the base materials (1), (3), (4), and (5) in accordance with the third arrangement embodiment, separation of the light selective transmission layer was observed only around the hole.

As in the first arrangement embodiment, it was shown that the separation (peeling) of the light selective transmission layer could be suppressed if the non vapor deposition part (edge) was formed around the vapor deposition part of the light selective transmission layer. The light selective transmission layers on the base material (2) that was a PEN film were not separated regardless of the arrangement embodiment of the tape for vapor deposition and existence of the hole. The base material (2) showed excellent adhesion to the light selective transmission layer. This would be because the adhesion between the light selective transmission layer and the base material film was improved due to a polar group such as an ester bond, or a methylene chain and an aromatic ring such as naphthalene which provides flexibility, of the base material (2), and/or due to crystallinity (oriented crystallization of a molecular chain by biaxial orientation) of the PEN film.

"Evaluation for Physical Properties of Light Selective Transmission Filter"

Tables 4 and 5 show the evaluation results of the transmittance, the adhesion, and the heat resistance at 260° C. of the light selective transmission filters including the base materials (1) to (5). The light selective transmission layer was deposited on both surfaces of each base material (1) to (5). The tape for vapor deposition had a shape in accordance with the above-mentioned first embodiment. The vapor deposition temperature was 90° C. The transmittance, the adhesion, and the heat resistance at 260° C. were evaluated by the following methods, respectively.

"Spectral Transmittance Measurement"

The transmittances at 400 to 600 nm and 750 to 1000 nm were measured using Shimadzu UV-3100 (product of Shimazu Corp.).

"Adhesion Evaluation"

Using a cutter, the vapor deposition part in a 1 cm×1 cm square of the light selective transmission filter was cut at 1 mm intervals in one direction, and also in the direction vertical thereto, it was cut at 1 mm intervals. As a result, 100 cross-cut squares were formed. Then, using a rubber spatula, cellophane tape was sufficiently attached to the surface where the cross-cut squares were formed of the light selective transmission filter, in such a way that no air was left between the tape and the surface. Then, the cellophane tape was peeled off. In such a manner, the number of the cross-cut squares which remained without being attached to the cellophane tape among the 100 cross-cut squares was counted. Cellophane tape (trade name: CT405AP-24, product of NICHIBAN CO., LTD.) was used as the cellophane tape.

"Evaluation for Heat Resistance at 260° C."

The base material was cut in 2 cm×1 cm. The upper end (the 1 cm side) of the film was fixed and then heated in an oven at 260° C. for 3 minutes.

TABLE 5

| Base material | Transmittance of light selective transmission filter (%) | | Thickness of light selective transmission filter (μm) | Adhesion (Cross-cut test) | Evaluation for heat resistance at 260° C. |
|---|---|---|---|---|---|
| | 400~600 nm | 750 nm~1000 nm | | | |
| (1) FPEK film | 85 or more | 5 or less | 55 | 100/100 | No change |
| (2-2) PEN film | 75 or more | 5 or less | 80 | 100/100 | No change |
| (3-1) Polyimide film | 85 or more | 5 or less | 55 | 100/100 | No change |
| (3-2) Polyimide film | 85 or more | 5 or less | 104 | 100/100 | No change |
| (4-1) F-PI film | 85 or more | 5 or less | 55 | 100/100 | No change |
| (4-2) PFA film | 85 or more | 5 or less | 55 | 100/100 | Wrinkled but not melted |
| (5) Epoxy film | 85 or more | 5 or less | 56 | 100/100 | No change |

As a result, in every light selective transmission filter, all of the 100 squares remained as a film. Such results show that there is no problem on the adhesion of the light selective transmission filters.

The evaluation for heat resistance at 260° C. shows that no changes were observed in the filters including the base materials (1), (2-2), (3-1), (3-2), (4-1), and (5), and the filter including the base material (4-2) got wrinkled but not completely melted down. Therefore, it is shown that the light selective transmission filters (1), (2-2), (3-1), (3-2), (4-1), (4-2), and (5) had reflow resistance and resisted a reflow process.

The present application claims priority under the Paris Convention and the domestic law in the country to be entered into national phase on Patent Application No. 2006-356401 filed in Japan on Dec. 28, 2006, the entire contents of which are hereby incorporated by reference.

The invention claimed is:

1. A lens unit comprising a light selective transmission filter selectively reducing a transmittance of light and a one or more lenses; wherein the light selective transmission filter is a UV and infrared cut filter and comprises:

a base material; wherein the base material is at least one member selected from the group consisting of a polyimide resin, a fluorinated aromatic polymer, a fluorinated polyimide resin, PFA and an epoxy resin and wherein the base material of the light selective transmission filter has a transmittance of 85% or more at each wavelength of 400-600 nm, maintains its shape at 260° C. for 3 minutes and has a glass transition temperature (Tg) of 150° C. or more, and a functional material layer comprising a light selective transmission layer formed on the base material, wherein the base material and the light selective transmission layer have a total thickness of less than 200 μm;

the light selective transmission filter has a transmittance of 85% or more at each wavelength of 400 to 600 nm, a transmittance of less than 5% at 350 nm or less in the UV region and a transmittance of 5% or less at 800 nm to 1 μm; and wherein at least one lens has a thickness of less than 800 μm.

2. The lens unit according to claim 1, wherein the light selective transmission filter has a structure in which a functional material is stacked on both surfaces of the base material.

3. The lens unit according to claim 2, wherein the light selective transmission filter has a structure in which the functional material is stacked on the base material at less than 120° C.

4. The lens unit according to claim 2, wherein the light selective transmission filter has a structure in which a functional material non-stacking part is formed around a functional material-stacking part when the functional material is stacked on the base material.

5. The lens unit according to claim 1, wherein the light selective transmission filter has a structure in which the functional material is stacked on the base material at less than 120° C.

6. The lens unit according to claim 1, wherein the light selective transmission filter has a structure in which a functional material non-stacking part is formed around a functional material stacking part when the functional material is stacked on the base material.

7. The lens unit according to claim 1, wherein the light selective transmission filter comprises a heat-treated functional film with reflow resistance.

8. The lens unit according to claim 1, wherein the light selective transmission layer is an infrared cut layer including a dielectric multilayer film.

9. The lens unit according to claim 1, comprising one or more lens having an Abbe number of 50 or more.

10. The lens unit according to claim 1 wherein the fluorinated aromatic polymer is a fluorinated aromatic polymer containing a repeated unit represented by the formula (1-1) or (1-2)

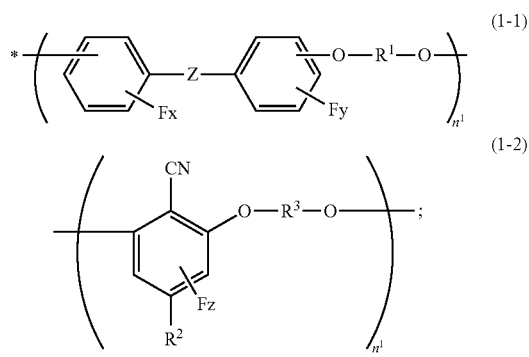

wherein in the formula (1-1), $R^1$ represents a divalent organic chain including an aromatic ring containing 1 to 150 carbon atoms; Z represents a divalent chain or a direct bond; each x and y is an integer of 0 or more; x+y satisfies 1 to 8; x and y are the same or different and each represent the number of a fluorine atom bonded to the aromatic ring; $n^1$ represents a polymerization degree within a range of 2 to 5000; and in the formula (1-2), $R^2$ represents a $C_{1-12}$ alkyl group, a $C_{1-12}$ alkoxy group, a $C_{1-12}$ alkylamino group, a $C_{1-12}$ alkylthio group, a $C_{6-20}$ aryl group, a $C_{6-20}$ aryloxy group, a $C_{6-20}$ arylamino group, or a $C_{6-20}$ arylthio group, wherein each may include a substituent; $R^3$ represents a divalent organic chain having an aromatic ring containing 1 to 150 carbon atoms; z is the number of a fluorine atom bonded to the aromatic ring and it is 1 or 2; and $n^1$ represents a polymerization degree within a range of 2 to 5000.

11. The lens unit according to claim 1 wherein the polyimide resin is a polyimide resin containing a repeated unit represented by the formula (3)

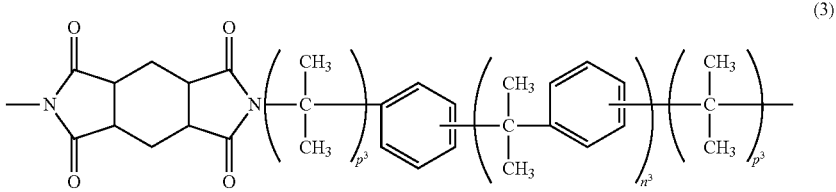

wherein in the formula (3), $n^3$ is an integer of 0 to 4; $p^3$ is 0 or 1; and $n^3+p^3$ is an integer of 1 to 5.

12. The lens unit according to claim 1 wherein the epoxy resin is an epoxy resin having an oxyalkylene skeleton.

13. The lens unit according to claim 1 wherein the fluorinated aromatic polymer is a fluorinated polyimide resin including a repeating unit represented by any of the following formulae (8-1)-(8-4), (9-1)-(9-4) and (10-1)-(10-4):

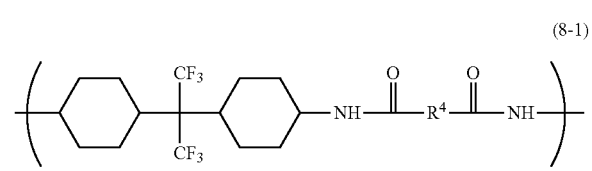

(8-1)

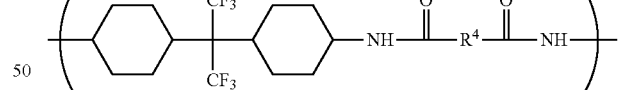

(8-2)

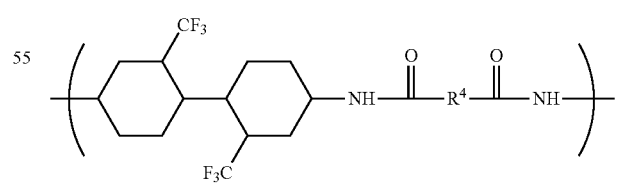

(8-3)

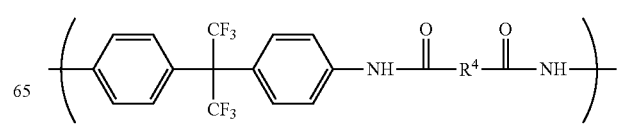

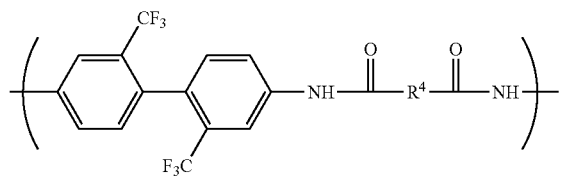

wherein, in the formulae (8-1)-(8-4), $R^4$ represents one or more divalent groups selected from the group consisting of a straight chain, a branched structure, an alicyclic structure, an aromatic ring, a hetero ring, and optionally containing at least one member selected from the group consisting of fluorine, oxygen, and nitrogen;

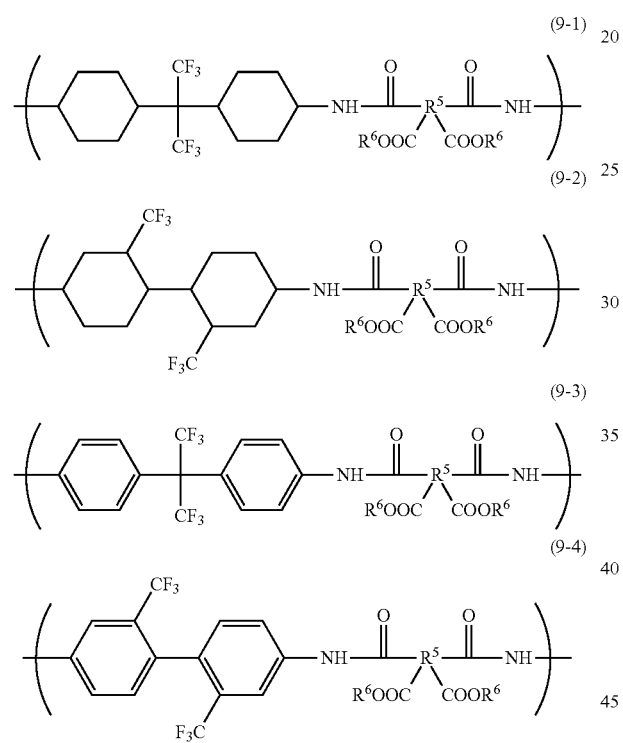

wherein in the formulae (9-1)-(9-4), $R^5$ represents one or more different tetravalent groups selected from the group consisting of a straight chain, a branched structure, an alicyclic structure, an aromatic ring, a hetero ring, and optionally containing at least one member selected from the group consisting of fluorine, oxygen, and nitrogen; and each $R^6$ independently is at least one member selected from the group consisting of hydrogen, a $C_{1-20}$ straight or branched alkyl group, and optionally containing at least one member selected from the group consisting of fluorine, oxygen, nitrogen, an unsaturated bond, and a cyclic structure;

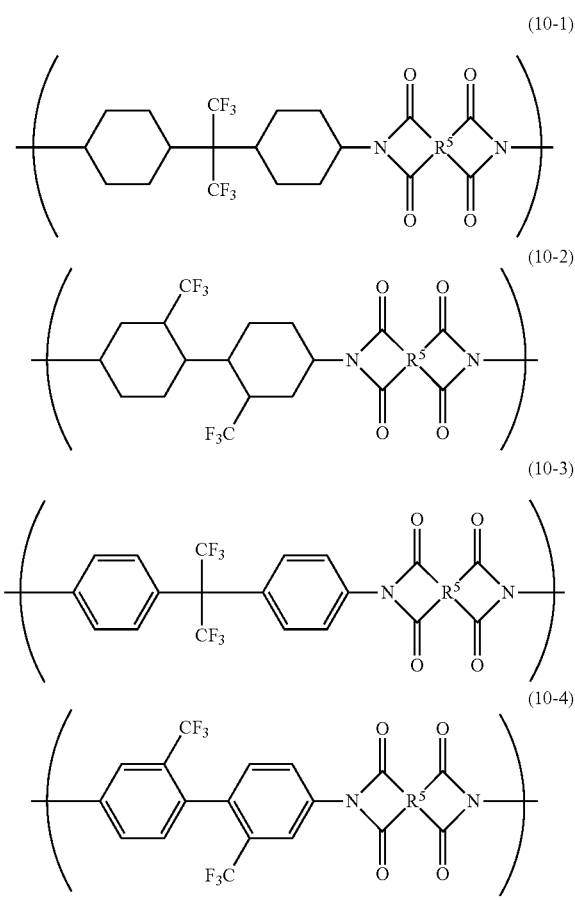

wherein in formulae (10-1)-(10-4), $R^5$ is one or more different tetravalent groups selected from the group consisting of a straight chain, a branched structure, an alicyclic structure, an aromatic ring, a hetero ring, and optionally containing at least one member selected from the group consisting of fluorine, oxygen, and nitrogen.

14. The lens unit according to claim 1 having a thickness of 50 mm or less.

15. The lens unit according to claim 1, wherein said at least one lens is an organic material comprising an organic resin which is thermally curable or an organic-inorganic composite material.

16. The lens unit according to claim 1 wherein each of the lenses has a thickness of less than 1 mm.

17. The lens unit according to claim 1 wherein the lens unit has a plurality of lenses.

* * * * *

UNITED STATES PATENT AND TRADEMARK OFFICE
CERTIFICATE OF CORRECTION

| | |
|---|---|
| PATENT NO. | : 8,014,071 B2 |
| APPLICATION NO. | : 11/965421 |
| DATED | : September 6, 2011 |
| INVENTOR(S) | : Ai Matsumoto et al. |

It is certified that error appears in the above-identified patent and that said Letters Patent is hereby corrected as shown below:

Claim 1, column 44, line 49, "and a one or" should read "and one or".

Signed and Sealed this
Twenty-fourth Day of April, 2012

David J. Kappos
*Director of the United States Patent and Trademark Office*